US010102281B2

United States Patent
Williams et al.

(10) Patent No.: US 10,102,281 B2
(45) Date of Patent: Oct. 16, 2018

(54) SEGMENTATION DISCOVERY, EVALUATION AND IMPLEMENTATION PLATFORM

(71) Applicant: Accenture Global Services Limited, Dublin (IE)

(72) Inventors: Murray Williams, Beacon, NY (US); Jeriad Zoghby, New York, NY (US)

(73) Assignee: Accenture Global Services Limited, Dublin (IE)

(*) Notice: Subject to any disclaimer, the term of this patent is extended or adjusted under 35 U.S.C. 154(b) by 531 days.

(21) Appl. No.: 14/834,097

(22) Filed: Aug. 24, 2015

(65) Prior Publication Data
US 2016/0110442 A1    Apr. 21, 2016

Related U.S. Application Data

(60) Provisional application No. 62/064,844, filed on Oct. 16, 2014.

(51) Int. Cl.
*G06F 17/30* (2006.01)
*G06Q 10/06* (2012.01)

(52) U.S. Cl.
CPC .. *G06F 17/30719* (2013.01); *G06F 17/30991* (2013.01); *G06Q 10/0637* (2013.01)

(58) Field of Classification Search
CPC ......... G06F 17/30598; G06F 17/30345; G06F 17/30569; G06F 17/30876
USPC ...................................................... 707/737
See application file for complete search history.

(56) References Cited

U.S. PATENT DOCUMENTS 8,781,916 B1    7/2014 Buryak
2011/0178846 A1    7/2011 Rane et al.

OTHER PUBLICATIONS

Australian Office Action in Application No. 2015242966, dated Jul. 26, 2016, 3 pages.
Australian Office Action for Application No. 2015242966, dated Mar. 30, 2017, 4 pages.
Canadian Office Action for Application No. 2,907,159, dated Oct. 23, 2017, 3 pages.
Australian Office Action for Application No. 2015242966, dated Oct. 21, 2016, 3 pages.

(Continued)

*Primary Examiner* — Grace Park
*Assistant Examiner* — Aida Z Tessema
(74) *Attorney, Agent, or Firm* — Fish & Richardson P.C.

(57) ABSTRACT

Methods, systems, and apparatus, including computer programs encoded on a computer storage medium, are described that enable clustering and evaluation of data. A data set is identified for which to evaluate cluster solutions, the data set including a plurality of records each including a plurality of attributes. Different attributes are identified, including target driver attributes, cluster candidate attributes, and profile attributes. One or more clustering algorithms are identified and applied to the data set to generate cluster solutions. Each cluster solution groups records in the data set into different clusters based on the cluster candidate attributes. A score is calculated for each cluster solution based at least on the target driver attributes, the cluster candidate attributes, and the profile attributes. A user interface is generated for presentation to a user showing the generated cluster solution organized according to the calculated score for each cluster solution.

15 Claims, 19 Drawing Sheets

(56) References Cited

OTHER PUBLICATIONS

Australian Office Action for Application No. 2015242966, dated Jul. 11, 2017, 6 pages.
Himmelspach et al., "Clustering Aproaches for Data with Missing Values: Comparison and Evaluation," 2010 Fifth International Conference on Digital Information Management (ICDIM), Jul. 5-8, 2010 [retrieved from Internet on Jul. 6, 2017], URL: <http://ieeexplore.ieee.org/document/5664691/>, 2 pages.
Eirola et al., "Distance Estimation in Numerical Data Sets with Missing Values," Information Sciences, vol. 240, Feb. 13, 2013 [retrieved from Internet on Jul. 6, 2017], URL: < http://research.cs.aalto.fi/aml/Publications/Publication203.pdf > pp. 115-128.
Canadian Office Action for Application No. 2,907,159, dated Oct. 26, 2016, 3 pages.
Anonymous: "Cluster analysis—Wikipedia",, May 10, 2013 (May 10, 2013), XP055375738, Retrieved from the Internet: URL:https://en.wikipedia.org/w/index.php?title=Cluster_analysis&oldid=576544197 [retrieved on May 24, 2017], 23 pages.
European Office Action in European Application No. 15189966.3, dated Jan. 17, 2018, 7 pages.
'Wikipedia' [online]. "Non-destructive editing," Jun. 2015, [retrieved Jul. 7, 2015]. Retrieved from the Internet at URL >https://en.wikipedia.org/wiki/Non-destructive_editing>, 2 pages.
'Photoventure.com' [online]. "The dark side of non-destructive editing," Feb. 2014, [retrieved Jul. 7, 2015]. Retrieved from the Internet at URL >http://www.photoventure.com/2014/02/14/the-dark-side-of-non-destructive-editing/>, 5 pages.
Extended European Search Report in Application No. 15189966.3 dated Mar. 3, 2016, 7 pages.

SEGMENTATION DISCOVERY, EVALUATION AND IMPLEMENTATION PLATFORM

CROSS-REFERENCE TO RELATED APPLICATION

This application claims priority from U.S. Provisional Application No. 62/064,844, filed Oct. 16, 2014, and titled "Segmentation Discovery, Evaluation and Implementation Platform," which is incorporated by reference.

TECHNICAL FIELD

This specification generally describes systems and processes for clustering data.

BACKGROUND

In many fields and industries, different types of data are collected and stored that are related to people (e.g., customers of a company, friends in a social network, etc.) or entities (e.g., individual stores of a retail chain, companies, schools, governments, or other institutions). Analyzing large amounts of data is important in numerous applications. One general approach to analyzing data, called clustering, involves segmenting the data into groups, or clusters, based on similarities and differences within the data.

SUMMARY

Techniques according to the present disclosure may be used to adapt and refine cluster solutions based on evaluations of previous cluster solutions using one or more evaluation criteria specified by a user. The system is therefore able to integrate the clustering of data with evaluation of the clustering results to generate cluster solutions that are meaningful to a user.

In one aspect, a computer-implemented method is executed by one or more processors. The method includes identifying a data set for which to evaluate cluster solutions, where the data set includes a plurality of attributes. The method also includes identifying a set of target driver attributes, a set of cluster candidate attributes, and a set of profile attributes from the plurality of attributes. The method further includes determining one or more clustering algorithms to apply to the data set to identify cluster solutions, and generating a plurality of cluster solutions for the data set. Each of the cluster solutions groups records in the data set into a plurality of clusters based on one or more of the cluster candidate attributes. The method further includes calculating a score for each of the cluster solutions based at least in part on the target driver attributes, the cluster candidate attributes, and the profile attributes, and generating a user interface for presentation to a user showing the plurality of generated cluster solution organized according to the calculated score for each cluster solution.

In some implementations, generating the plurality of cluster solutions for the data set includes identifying the cluster solutions using a machine-learning algorithm based on previously calculated scores for cluster solutions.

In some implementations, the method further includes, while generating the plurality of cluster solutions, presenting a report to a user showing generated cluster solutions and allowing the user to change the sets of attributes associated with the data set.

In some implementations, the calculated score for each cluster solution includes a target driver component representing a degree to which each cluster solution covers a range of values associated with the target driver attributes, a grouping component representing how tightly grouped the clusters in each cluster solution are across the cluster candidate attributes, and a heterogeneity component representing a degree of heterogeneity of the clusters in each cluster solution across both the cluster candidate attributes and the profile attributes.

In some implementations, the calculated score for each cluster solution includes a weighted average of the target driver component, the grouping component, and the heterogeneity component.

In some implementations, the method further includes, before generating the cluster solutions, transforming the data set into a format configured to facilitate generating the cluster solutions.

All or part of the features described throughout this application can be implemented as a computer storage medium encoded with a computer program, the computer program including instructions that are executable by one or more processors. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

Figure 1:
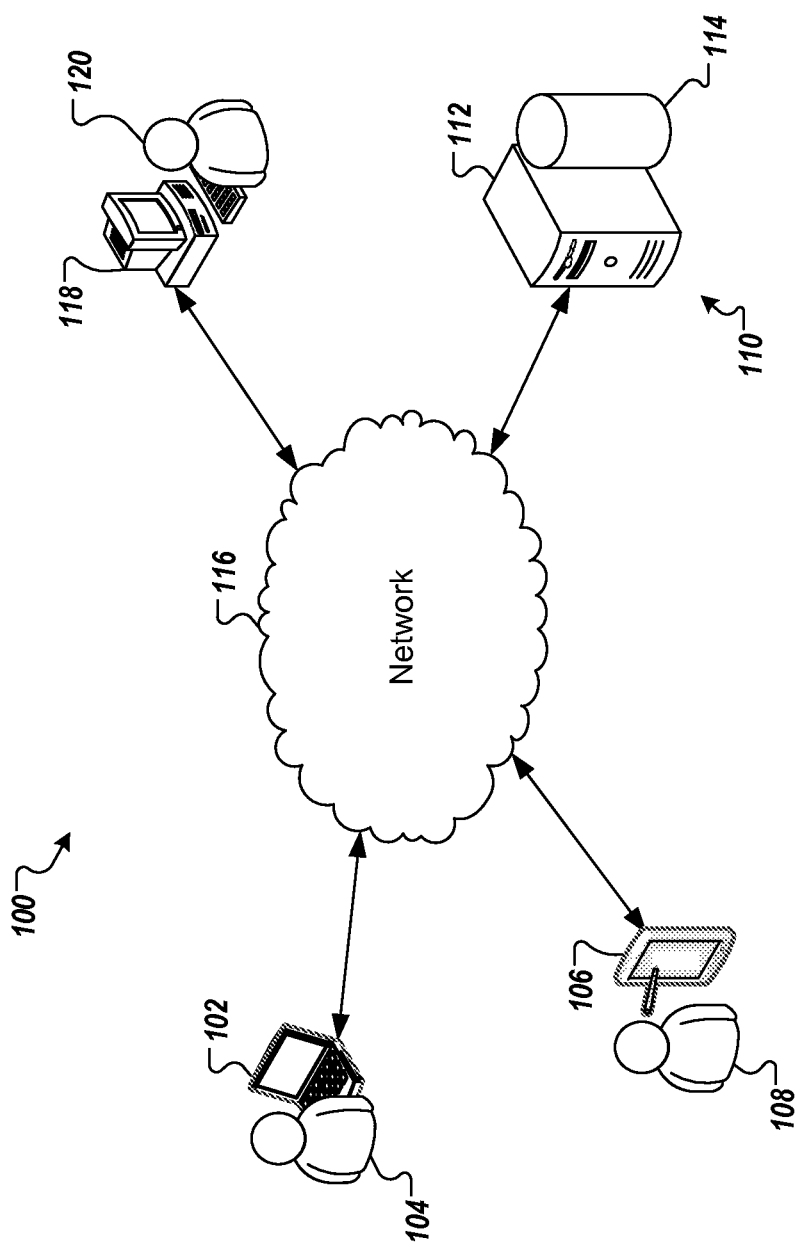
FIG. 1 is a block diagram illustrating an example of a system that can execute implementations of the present disclosure.

In the following text, a detailed description of examples will be given with reference to the drawings. It should be understood that various modifications to the examples may be made. In particular, elements of one example may be combined and used in other examples to form new examples. Like reference symbols in the various drawings indicate like elements.

DETAILED DESCRIPTION

For large amounts of data with many different characteristics, there may be a number of different ways to segment the data into clusters. For example, there may be many different potential groupings for a particular population of people (e.g., customers of a company) each having a plurality of attributes (e.g., customer status (active, inactive, etc.), address (e.g., grouping by state), etc.). Furthermore, as quantities of data with significant breadth (e.g., variation in attributes collected about each individual customer) are collected and stored, finding meaningful groupings in the data may become time-consuming. In addition, different clustering algorithms (e.g., K-means Clustering, Expectation-Maximization (EM) Clustering, Hierarchical Clustering, etc.) may produce different groupings. In such scenarios, determining which clustering technique yields the most meaningful group of clusters may be difficult.

As a particular example, a clustering algorithm known as the k-means algorithm takes as input a data set, as well as a selection of variables and a target number of clusters, and returns a grouping of the data set based on the characteristics of those variables. The number of possible clustering results generated by the k-means algorithm may be large, and evaluating the results to determine the most appropriate grouping may be difficult. For example, if a data set has 5 variables out of 75 to input into the k-means algorithm, there are 17,259,390 possible clustering results to evaluate. As another example, if the total number of available variables increases to 150 (i.e., twice as many options), the potential solution set increases to 591,600,030 (i.e., by a factor of over 34.) In some scenarios, it is not uncommon to have upwards of 200 or more available variables to choose from.

Therefore, even if a user utilizes clustering algorithms (as well as software packages that implement these algorithms) to discover clusters within data, the user may still face some daunting tasks, such as coordinating the mass application and evaluation of these algorithms across a large space of possible solutions. Typically, such tasks are performed in an ad hoc fashion, resulting in inefficient work and often ineffective solutions.

To overcome such difficulties, techniques according to the present disclosure may be used to adapt and refine cluster solutions based on evaluations of previous cluster solutions using one or more evaluation criteria specified by a user. The system is therefore able to integrate the clustering of data with evaluation of the clustering results to generate cluster solutions that are meaningful to a user.

The evaluation of the clustering results may be based on user-specified criteria, such as business objectives specified by the user. As an example, the evaluation information may include a quantitative and/or qualitative summary of the nature of the clusters in terms of their business value, including descriptive qualities of the clusters. This may allow a user to more easily identify potential insights that may emerge from certain clustering solutions. As such, the system may provide more meaningful clustering analysis of data than otherwise would be possible by merely generating clustering solutions.

As an example of this process, the system may identify a data set for which to evaluate cluster solutions. The data set may include a plurality of records, each record including a plurality of attributes. The system may identify, from the plurality of attributes, different types of attributes. For example, the system may identify a set of target driver attributes, a set of cluster candidate attributes, and a set of profile attributes. The system may also determine one or more clustering algorithms to apply to the data set to identify cluster solutions. Using the one or more clustering algorithms, the system may generate a plurality of cluster solutions for the data set.

Each of the cluster solutions may be a grouping of records in the data set into a plurality of clusters based on one or more of the cluster candidate attributes. As an illustrative example, a first cluster solution may include 3 different clusters, or groups, based on a particular grouping of data, with each cluster or group including about 33% of the population in the data. Another cluster solution may include 10 different clusters, or groups, according to different grouping of data, with each cluster or group including about 10% of the population in the data. The system may determine evaluation information (e.g., calculate a score) for each of the cluster solutions based at least in part on the target driver attributes, the cluster candidate attributes, and the profile attributes. The system may then generate a user interface for presentation to a user showing the plurality of generated cluster solution organized according to the calculated scores for each cluster solution.

In some implementations, the system may be configured to select a particular subset of variables from a large dataset from which to compute a clustering solution. For example, consider a dataset with 75 variables, all of which could be used as candidates for a clustering solution. Also assume that the system is configured to use as few as 5 and as many as 8 variables in the clustering computation. The total number of possible clustering solutions would then be equal to the sum of the total number of possible 5-variable solutions, the total number of possible 6-variable solutions, the total number of possible 7-variable solutions, and the total number of possible 8-variable solutions. Thus, the total number of possible solutions may be computed as follows, using standard combinatorics techniques:

$$\binom{75}{5}+\binom{75}{6}+\binom{75}{7}+\binom{75}{8}$$

In this example, there are over 19 billion solutions that the system may consider. If the system analyzed 5-variable to 10-variable solutions, then there would be over 973 billion solutions. As the total number of variables considered increases, the solution becomes even larger. Therefore, the system may be configured to analyze only a particular subset of variables, and also to determine a range of the number of such variables to be considered, in the clustering solution. As a particular example, for a data set of 10,000 customers with voluminous data (e.g., from a customer survey), the system may select a subset of variables from that data set (e.g. 5 variables) and generate a clustering solution that divides those 10,000 customers into 4 different groups or clusters.

In some implementations, the system may also be configured to use a particular number of clusters, or range of numbers of clusters, in the clustering solution. In some scenarios, the number of clusters to be used for a particular set of data may depend on the nature of the data. As an example, a particular dataset may yield poor clustering results for 3-cluster or 4-cluster solutions, and poor clustering results of 8-clusters or more. In some implementations, the system may be configured to determine an appropriate number of clusters to be used in a clustering solution. For example, the system may generate and enable the analysis of graphs of the evaluation scores to determine which ranges of cluster sizes yield the best results.

In some implementations, the number of clusters to be used in a clustering solution may be received as an input from a user or another source. For example, in some scenarios, a company may want to minimize the number of clusters to be used in a clustering solution, for example, because the number of generated clusters may be related to a number of distinct programs that the company would implement for different groups of customers. Regardless of the reason for deciding on a particular number of clusters, the system may be configured to receive an input related to a particular number or range of numbers of clusters to be used in generating a clustering solution.

Therefore, in some implementations, there may be two different ranges that may be input into the system: (1) a range of variables that may be used to generate a clustering solution; and (2) a range of numbers of clusters to be used in generating a clustering solution.

In some implementations, generating the plurality of cluster solutions for the data set includes identifying the cluster solutions using a machine-learning algorithm based on previously calculated scores for cluster solutions. As such, the evaluation of cluster solutions may be fed-back as input to the clustering engine, and may enable automatic adjustment and refinement of the clustering engine based on evaluations of previous cluster solutions.

In some cases, while generating the plurality of cluster solutions, the system may present a report to a user showing generated cluster solutions and allow the user to change the sets of attributes associated with the data set. The report may include any suitable information based on the evaluation of the cluster solutions. This may enable the user to visualize the cluster solutions and adjust one or more attributes of the clustering analysis based on the evaluation results presented in the report. The evaluation of the cluster solutions may be based on one or more rules specified by the user, such as one or more business objectives that are important to the user.

The calculated score for each cluster solution may include one or more different components. For example, the calculated score may include a target driver component, a grouping component, and a heterogeneity component. The target driver component may represent a degree to which each cluster solution covers a range of values associated with the target driver attributes. The grouping component may represent how tightly grouped the clusters in each cluster solution are across the cluster candidate attributes. The heterogeneity component may represent a degree of heterogeneity of the clusters in each cluster solution across both the cluster candidate attributes and the profile attributes.

In some cases, the calculated score for each cluster solution may include a weighted average of the different components (e.g., a weighted average of the target driver component, the grouping component, and the heterogeneity component). The different components may also grouped in other ways to yield the calculated score. In addition, other components and other information may also be used, as appropriate, to yield the calculated score.

Before generating the cluster solutions, the system may transform the data set into a format configured to facilitate generating the cluster solutions. For example, the system may provide an interface by which the user can create transformation rules that, when applied on the variables of the data set, map those variables to values that will be usable by the clustering process. Such transformation rules may include, as examples, normalization, mapping categorical data to numbers, replacing missing data or outliers (extreme values) with prescribed replacements, etc.

FIG. 1 depicts an example system 100 in which implementations of the present disclosure may be implemented. In the example system 100 of FIG. 1, computing device 102, operated by user 104, and computing device 106, operated by user 108, may perform some aspects of the clustering and evaluation techniques. For example, the computing devices 102 and 106 may perform user input/output operations and data visualization operations that allow the user to explore and interact with data.

In some implementations, more intensive computational operations may be performed by another computing system, such as system 110. The system 110 may include one or more servers (e.g., server 112) and one or more storage devices (e.g., storage device 114) storing computer-readable instructions. The server 112 may communicate, as needed, with the computing devices 102 and 106 to perform the clustering and evaluation operations. For example, the system 110 may store the data to be clustered, execute clustering algorithms on the data, and/or store the resulting cluster solutions. The system 110 may use server-side information and processing to interact with the computing devices 102 and 106 (e.g., in real-time) as the computing devices 102 and 106 execute applications or web-based interfaces that interact with the users 104 and 108. The system 110 may communicate with the client devices 102 and 106 by any suitable communication medium, such as a communication network 116.

As such, in some implementations, the system enables computation work to be sent to be done by external hardware (e.g., a supercomputer, a networked grid, etc.), which may, for example, provide greater computing resources that enable generating a large number of solutions relatively quickly. As an example, a user may perform data visualization on a mobile electronic device 102 and/or 106 (e.g., a laptop, an electronic tablet, etc.), while assigning computation jobs to be done by a remote system 110 (e.g., "in the cloud").

The review and exploration of the resulting cluster solutions may be done by a mobile electronic device (e.g., devices 102, 106) that provides highly interactive data visualization features, without necessarily requiring the mobile device to perform intensive computational work. Such separation of activities in the overall platform may yield better performance across the individual activities.

In some implementations, there may be one or more additional computing devices (e.g., device 118 in FIG. 1) operated by one or more other users (e.g., user 120 in FIG. 1) that perform parts of the clustering and evaluation process. Such users may, for example, work in conjunction with users 104 and/or 108 to perform different operations of clustering and evaluation.

The computing devices 102, 106, 110, and 118 may be any suitable computing devices, such as laptop or desktop computers, smartphones, personal digital assistants, wearable computers, portable media players, tablet computers, or other appropriate computing devices that can be used to communicate with an electronic communication network. In addition, one or more of the computing devices 102, 106, 110, and 118 may perform client-side operations, as discussed in further detail herein. Also, the computing system 110 may include one or more computing devices, such as a computer server. Further, the computing system 110 may represent more than one computing device working together to perform the server-side operations, as discussed in further detail herein.

The network 116 may be a public communication network, e.g., the Internet, cellular data network, dialup modems over a telephone network, or a private communications network, e.g., private LAN, leased lines. The network 116 may include one or more networks. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication may occur through a radio-frequency transceiver. In addition, short-range communication may occur, such as using a BLUETOOTH, Wi-Fi, or other such transceiver.

Figure 2:
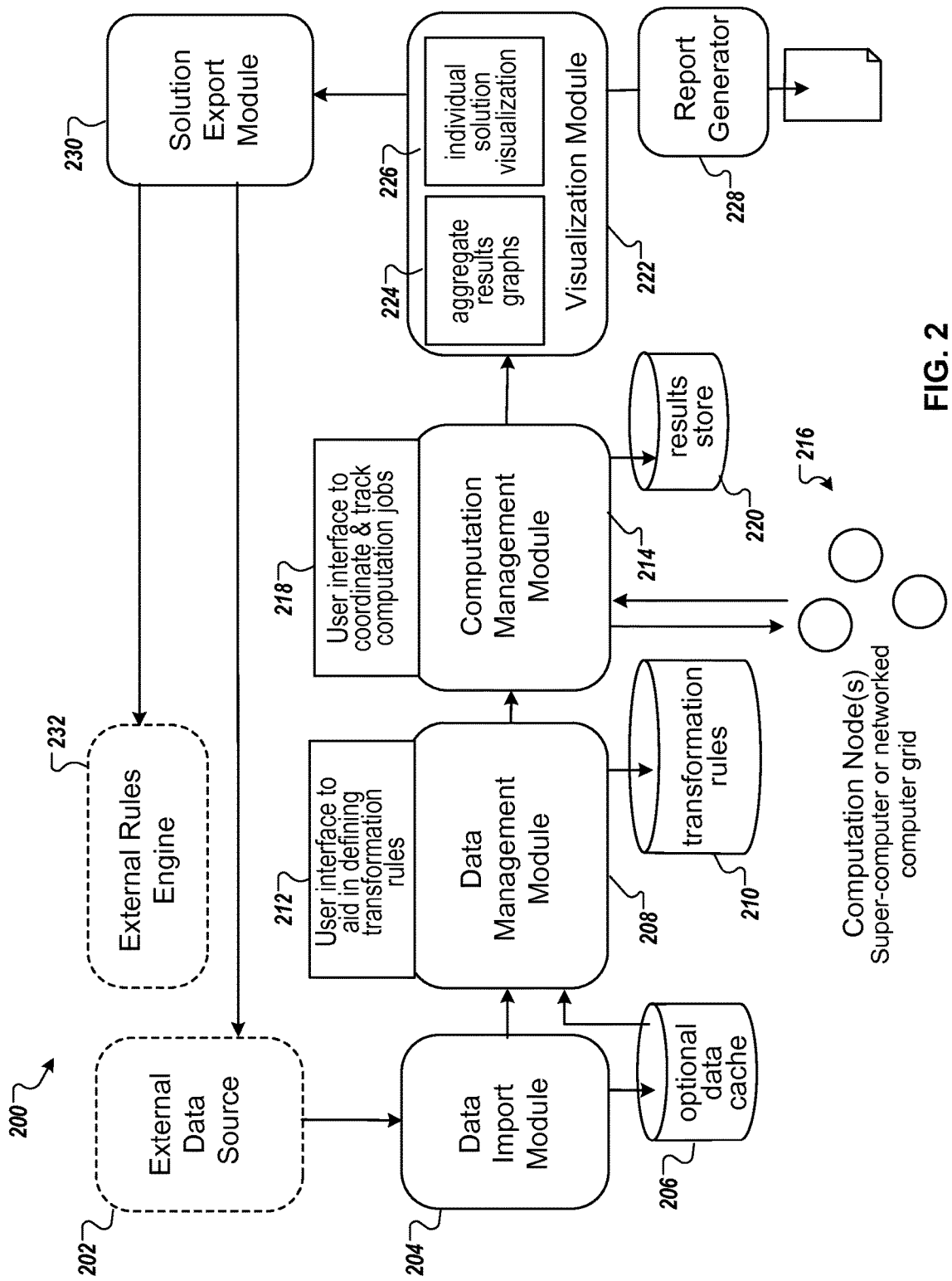
FIG. 2 is a block diagram illustrating an example of components of a system that performs integrated clustering and evaluation.

FIG. 2 illustrates an example of components of a system that performs clustering and evaluation. The system 200 in FIG. 2 may be implemented in a distributed manner across multiple devices and systems (e.g., in devices 102, 106, 110, and/or 118 in FIG. 1), or some (or all) components may be installed on the same device. Components on separate devices may use any suitable communications technique to transmit data (represented by the arrows) between one another. For example, in some implementations, the system may be implemented as a distributed computing platform that coordinates the search and discovery of high-value segmentation strategies in data sets with large numbers of variables.

In the example of FIG. 2, data may be accessed from a data source 202 by data import module 204. The data import module 204 may optionally store some or all (or none) of the data in a local data cache 206. The imported data may then be passed to a data management module 208 for processing prior to clustering. For example, the data management module 208 may organize the data by grouping, ordering, transforming, and/or "cleaning" the data in such a way that facilitates input of the data into clustering processes. The data management module 208 may use one or more transformation rules that specify one or more rules to apply to the data for processing. In some implementations, the transformation rules may be accessed from storage (e.g., from data store 210). Additionally or alternatively, the transformation rules may be input by a user. For example, the data management module 208 may provide a user interface 212 to a user that enables the user to specify one or more transformation rules.

The data management module 208 may also identify different types of variables or attributes that are specified by the user, and separate the variables according to the identified type. Some types of variables may be used as inputs to the clustering process, while other types of variables may be used evaluation criteria to evaluate the resulting cluster solutions. As such, the system may enable not only automated clustering of data, but also automated evaluation of the resulting cluster solutions. For example, the system may separate variables in the data across three distinct types: Target Drivers, Cluster Candidates, and Profile Variables. Details of these three variables are described with reference to FIG. 3, below.

The data management module 208 may then send the processed data to the computation management module 214. The computation management module 214 may send the processed data and one or more chosen clustering algorithms to one or more computational nodes 216 to perform clustering operations. The clustering operations may identify several (e.g., thousands or millions) different cluster solutions, each including a plurality of clusters of the data.

The computation management module 214 may also apply one or more generalized heuristic supervised learning algorithms to the computation process to improve the efficiency of the solution search, based on the cluster solutions generated by the computational nodes 216. The supervised learning algorithms may utilize target driver variables specified by the user to facilitate searching for particular cluster solution(s), among the potentially many cluster solutions generated by the computation nodes 216, that are meaningful to the user. As an example, the heuristic optimization algorithm may be an adaptation of Simulated Annealing. Further details of the supervised learning algorithms are provided with reference to FIG. 6, below.

The computation management module 214 may also provide a user interface 218 that shows the user the progress of the clustering and/or the search algorithm, if one is utilized, so that the user may decide if different search algorithm parameters are likely to yield better results. In particular, the computation management module 214 may evaluate the cluster solutions based on user-specified business criteria, and show the user the results of the evaluation to determine which cluster solutions are particularly relevant to the user.

As an example, the computation management module 214 may evaluate the quality of the cluster solutions using a weighed scoring system. The computation management module 214 may use the scores in several ways, such as: (a) assisting in the search algorithm, if one is utilized, and/or (b) allowing the user to scrutinize only those solutions with the highest overall scores. In some implementations, the quality score is based on a weighted combination of factors that are evaluated on the variables that have been separated by the data management module 208, for example: how well the solutions cover the range of values from the Target Drivers; how tightly grouped the clusters are across the chosen Cluster Candidates; and the overall diversity or heterogeneity of the clusters across both the Cluster Candidates and the Profile Variables.

The computation management module 214 may then review the individual cluster solutions, including statistics about the variables that were not selected by the algorithm. The computation management module 214 may record observations and descriptions of the resulting cluster solutions. In some implementations, the computation management module 214 may select one or more cluster solutions that are deemed to be the "optimal" cluster solutions, based on user-specified criteria. The computation management module 214 may store one or more of the cluster solutions in memory, such as results store 220.

In some cases, the computation management module 214 may "score" or assign new data records (not used in the previously described computations) to one or more of the cluster solutions (e.g., the optimal cluster solutions). In some implementations, the computation management module 214 may export or "push" the one or more cluster solutions (e.g., the optimal cluster solutions) to an external system so it can assign new data records to the optimal cluster solutions using its own data, without necessarily requiring further intervention or assistance by the system 200.

The computation management module 214 may then provide one or more cluster solutions to the visualization module 222. The visualization module 222 may provide one or more user interfaces (e.g., an interface 224 showing aggregate results graphs, and/or an interface 226 showing individual solution visualization) to rapidly explore the generated set of cluster solutions.

The visualization module 222 may provide interfaces (e.g., 224, 226) that allow a user to easily view both a visualization of an individual cluster solution and the larger collection of cluster solutions that have been generated. This may, for example, facilitate a user to determine answers to questions such as, "Are there similar solutions that used most of the same cluster candidates, but which had a better Solution Diversity Score?" (one of the three primary scoring metrics) or, "What other variables were evaluated near this solution space that act as fair replacements for a variable that I have discovered cannot be used?"

The visualization module 222 may then provide the resulting cluster solution(s) and results of the evaluation to a report generator 228, which generates a report to be output to the user. The report may include various types of information regarding the evaluation of the cluster solution(s), and may enable a user to adjust one or more variables or other inputs of the system 200 to fine-tune the clustering operations.

In some implementations, the visualization module 222 may also provide the cluster solution(s) and/or evaluation results to a solution export module 230. The solution export module 230 may then provide feedback information to the system 200 or other systems. For example, the solution export module 230 may provide feedback information to an external rules engine 232, which may, for example, use the feedback information to adapt one or more transformation rules. Additionally or alternatively, the solution export module 230 may feedback information to the external data source 202, for example, to adjust one or more variables or attributes in the data.

For example, the solution export module 230 may be configured to export information regarding a clustering solution to different types of external databases and external systems, and facilitate the implementation of the clustering solution by the external systems. In some implementations, the solution export module 230 may be configured to export one or more rules or algorithms for clustering data, based on the clustering solution that was generated. The rules or algorithms may enable external systems to apply those rules or algorithms to implement the generated clustering solution to various types of data stored on the external database. In some implementations, the system may obtain data from the external system, retune the clustering solution based on the received data, and send information regarding a revised clustering solution to the external system. As such, in some implementations, the system may enable more than just an analytics tool, but also enable a feedback-based and connected enterprise system.

As a particular example, for a data set of 10,000 customers with voluminous data (e.g., from a customer survey), the system may select some subset of variables from that data set (e.g. 5 variables) and generate a clustering solution that divides those 10,000 customers into 4 different groups. For example, cluster A may include "high-value" customers that generate a majority of the company's profits, such that the company may want to ensure maintaining its marketing budget for those customers; cluster B may include "moderate-value" customers; cluster C may include "low-value" customers that generate very little profits and may even cost the company money; and cluster D may include "prospective" customers that represent opportunity for new sales, such that the company may want to market to them more aggressively.

Now consider a scenario in which, after those 10,000 customers have been assigned to four clusters, the company wants to organize and cluster another 1 million customers into the four cluster groups. The system may be configured to export a solution, e.g., as a basic algorithm, that the company's computer systems may be able to use to assign new customer records to the four cluster groups. As illustrative examples, the exported solution may be in the form of a special SQL function that can be processed by the company's customer database, or a Hadoop Map-Reduce algorithm that can similarly be processed on the company's BigData Hadoop cluster, etc. In some implementations, the exported solution may enable the company to implement the clustering solution in a manner that is independent of system that generated the clustering solution, such that the company can easily implement the clustering solution locally within its own systems. In some implementations, the exported solution may only need as input the selected subset of variables (e.g., 5 variables in the example above) that were used in the clustering solution computation.

By providing a composite technique of cluster generation and cluster evaluation, the system enables the user to analyze the details and nuances of many (e.g., dozens of) solutions at the same time, rather than individually analyzing one solution at a time to see if each solution is appropriate. The system 200 may therefore enable a user to explore a large number (e.g., millions) of cluster solutions efficiently in less time than it would take a typical practitioner to evaluate fewer (e.g., a couple dozen) cluster solutions.

In some implementations, the interfaces 212, 218, 224, 226 may be custom-designed user interfaces that facilitate some portion of the overall activity and, in some cases, may be used by multiple users with different roles. As such a system according to the present disclosure may coordinate and facilitate a distributed process of cluster generation and evaluation, and streamline the tasks and roles that potentially involve the participation of multiple people.

For example, the operations described above with reference to FIG. 2 may involve the participation of different people in roles. Some examples of such roles and examples of tasks performed by each role are given below:

System Administrator or Integration Engineer. Involved in the initial task of configuring the incoming data source and the channel that allows a final solution to be "pushed" to an external system.

Data Analyst. An analyst or technician who applies a basic methodology to review the incoming data and "clean" it by organizing it, assigning replacement values for missing data, transforming variables within a known collection of automated methods to "prep" the data to be more effective in the clustering algorithms, identifying which variables should be designated as target drivers, cluster candidates or profile variables, etc.

Clustering Specialist. Specialist in the application of clustering algorithms to data and evaluating the quality of the solutions based on known standards. Will work with the system to generate many (e.g., thousands or millions) solutions and provide a list of candidates to the business analyst.

Business Analyst. This specialist in the particular business field will have the qualifications to review the profile of the top solutions. The innovation is designed to clearly summarize the nature of the clusters (their business value and the descriptive qualities based on summary statistics evaluated on both the cluster and profile variables) so that the business analyst can identify potential insights that may emerge from certain solutions.

Corporate Executive. Primary stakeholder who will review reports generated by the system using the business analysts' insights. This person will make actionable strategic business decisions (whether marketing strategies or business operations strategies) based on the reports.

The system enables such groups of people to work together with speed and precision and mitigates problems of ineffectiveness and indecisiveness. In particular, the system facilitates the different roles by identifying different types of variables in the data that are relevant to different operations in the overall process.

Figure 3:
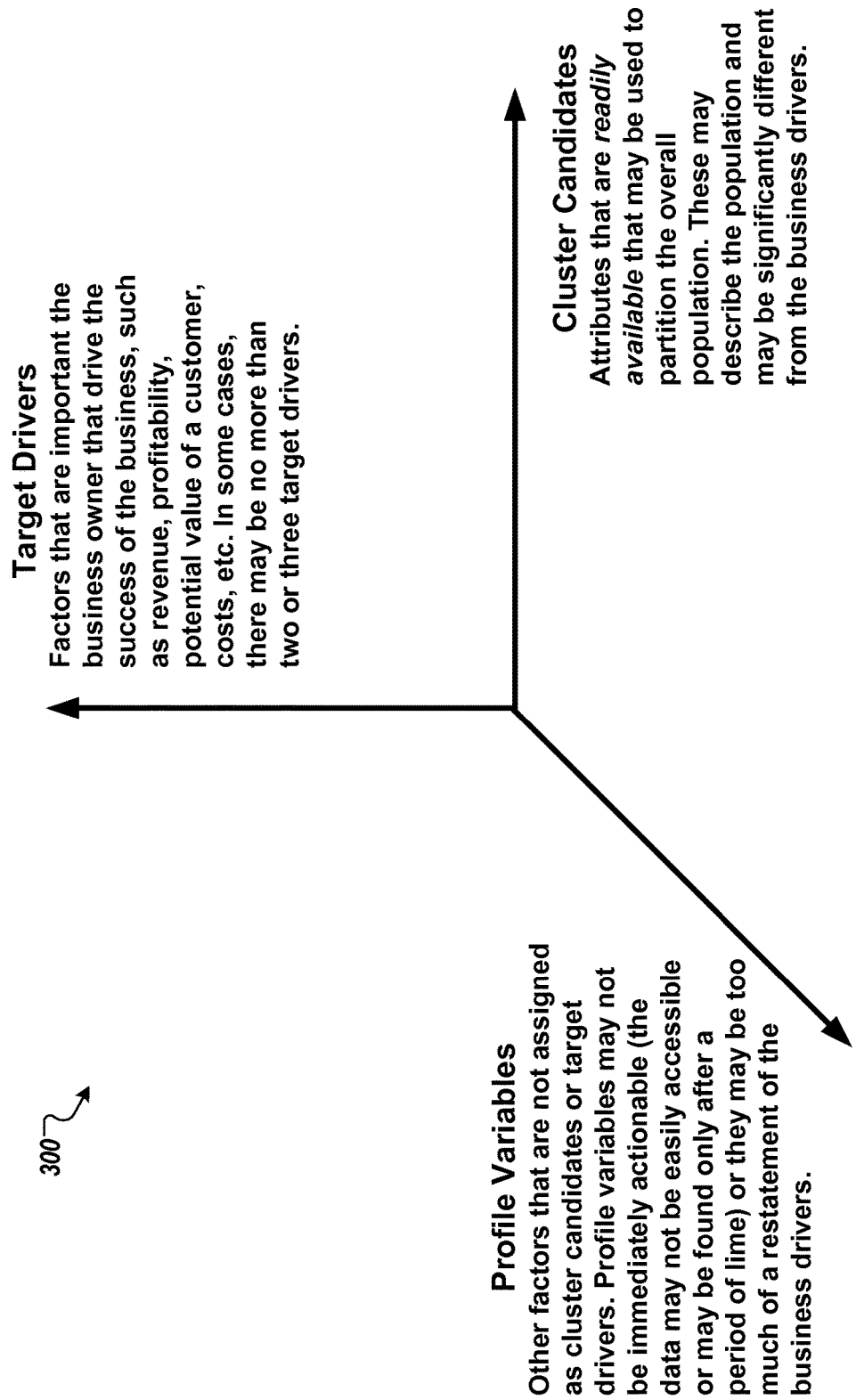
FIG. 3 is a diagram illustrating the separation of attributes for a data set into three types of variables.

FIG. 3 is a sketch illustrating an example of three different types of variables that the system may identify in the data. In this example, a system directs the user to partition variables from the data set across three distinct types (illustrated as different axes of a three-dimensional space 300 in FIG. 3): Target Driver, Cluster Candidates, and Profile Variables.

In some implementations, partitioning the variables into these types enables a user to create a descriptive function whereby a few simple, immediately available factors can be used as an input. The output may be, in some implementations, the assignment to a cluster that has an inherently high or low degree of value with regard to the Target Drivers.

For example, given a potential customer for which some basic characteristics are available to the system (e.g., age, gender, time of day the potential customer is going shopping, whether the potential customer is shopping at a store that is in a rural or urban neighborhood, etc.), the system enables a user to assign that potential customer to a cluster and determine the importance of that cluster to the user's business (e.g., high-spend tendency, purchases products that have a higher profit margin, etc.).

The characteristics that are used as inputs are chosen from the cluster candidates, and, in some implementations, the number of characteristics used is chosen based on efficiency and descriptiveness, for example, small enough to be manageable and large enough to be descriptive. The qualities of business value assigned to the clusters are described by the target drivers, and in some implementations, the clusters differ significantly with regard to these values so that a user knows which high-performers and/or low-performers the user can focus on when making strategic business decisions.

Remaining variables are, in some implementations, used to more richly describe the clusters and to gain insights into the nature of the clusters. The analysis of these profile variables may, for example, bring insights into various characteristics, such as: (a) why these populations result in high or low business value, (b) the interests that these populations have (if the user is clustering on customers) so that the user can most effectively market to them, or (c) any other suitable characteristics that the user may want to optimize or minimize, such as wasted sales-floor space or unrealized opportunities.

The implementations described above may be used, for example, as an alternative to ad hoc techniques in which a clustering practitioner selects some "variables of interest" from a collection of variables, runs an unsupervised machine learning algorithm such as k-means clustering, and then inspects all of the variables in the resulting solution to see if any interesting characteristics appear in the results.

In some implementations, various problems that occur with such ad hoc approaches may be mitigated. Such problems may include, for example:

A tendency to put target drivers into the clustering solution.

This is counter-productive, because inputs can get confused with outputs. For example, if a user wants to differentiate high-profit customers from low-profit customers, and the user selects "total shopping cart value" and "total sales profit" as variables in a cluster solution, the user is not likely to yield the desired result. In this example, the user is effectively seeking the solution "the people who yield the most sales are people bought the most stuff," which does not yield much insight into the customers.

Instead the system may generate cluster solutions that enable a user to assign customers to different clusters based on non-target-driver aspects. For example, the system may enable a user to discover that a particular cluster (e.g., customers whose overall business value is high) is identified by a customer purchasing a larger proportion of name-brand items with a tendency to purchase particular types of items (e.g., sporting equipment, jewelry, etc.) at certain times (e.g., during the middle of the afternoon).

A tendency to put unavailable or non-actionable attributes into a clustering solution.

In some examples, data may be acquired by conducting a survey with a sample of customers (e.g., about their shopping habits, opinions about whether prices are too high, etc.). Such data may be insightful from a business perspective (e.g., in describing the characteristics of people in the different clusters) but they may not be actionable from a clustering point of view because a user cannot survey all the customers a priori (before they walk in the door) in order to figure out which clusters the user should assign them to.

A system according to the present disclosure may partition variables in order to focus only on those variables that will tend to be available and knowable a priori as inputs for the clustering solutions. The system may use target drivers, for example, to derive an evaluation criterion that will be used by a search algorithm (e.g., a heuristic search algorithm) that seeks clustering solutions. It summarizes the information provided by the remaining variables and presents them as descriptions of the resulting clusters to illuminate any valuable insights for the clustering practitioner and the business owner.

Figure 4:
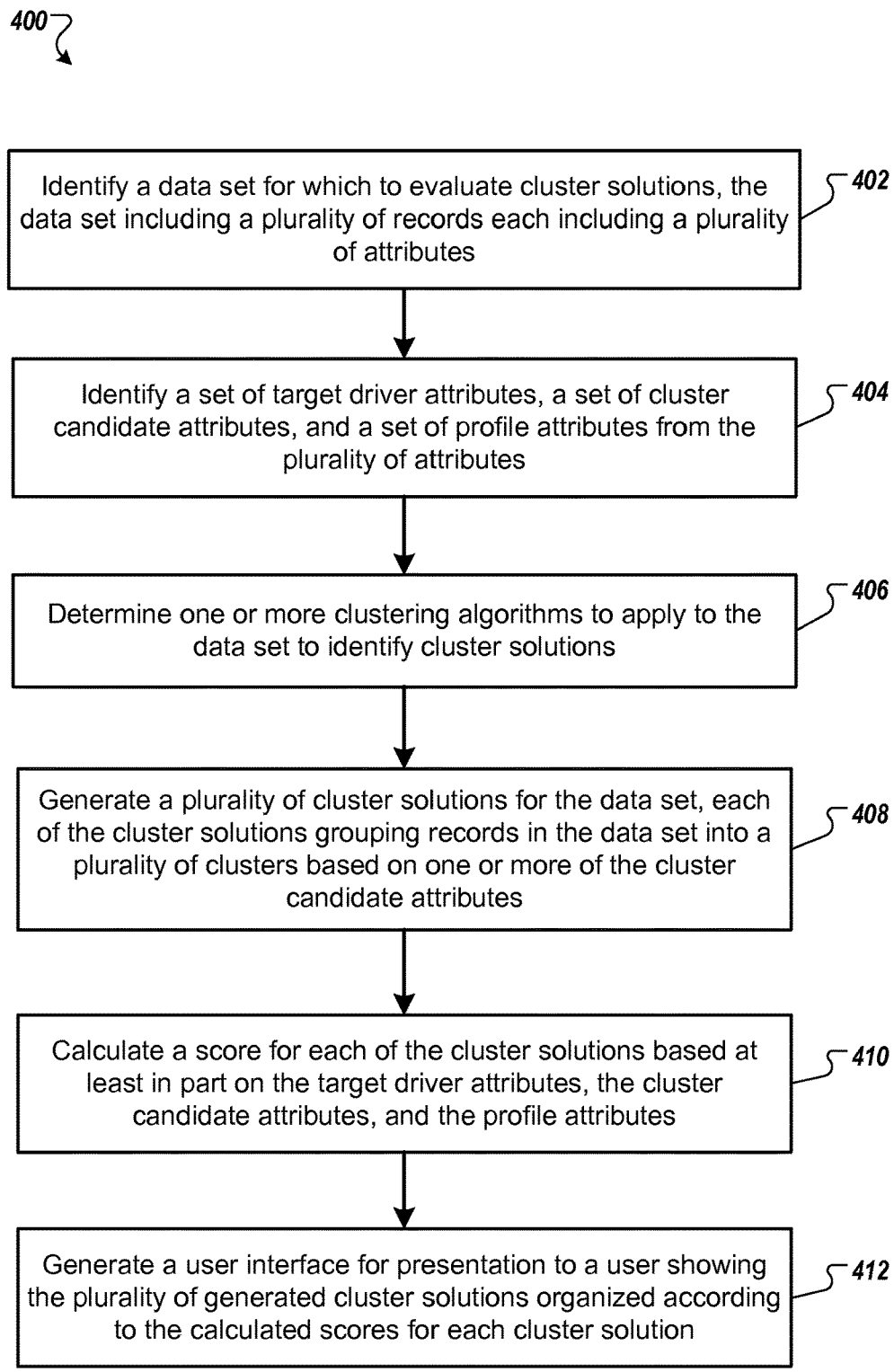
FIGS. 4-6 are flow charts illustrating examples of performing integrated clustering and evaluation.
Figure 5:
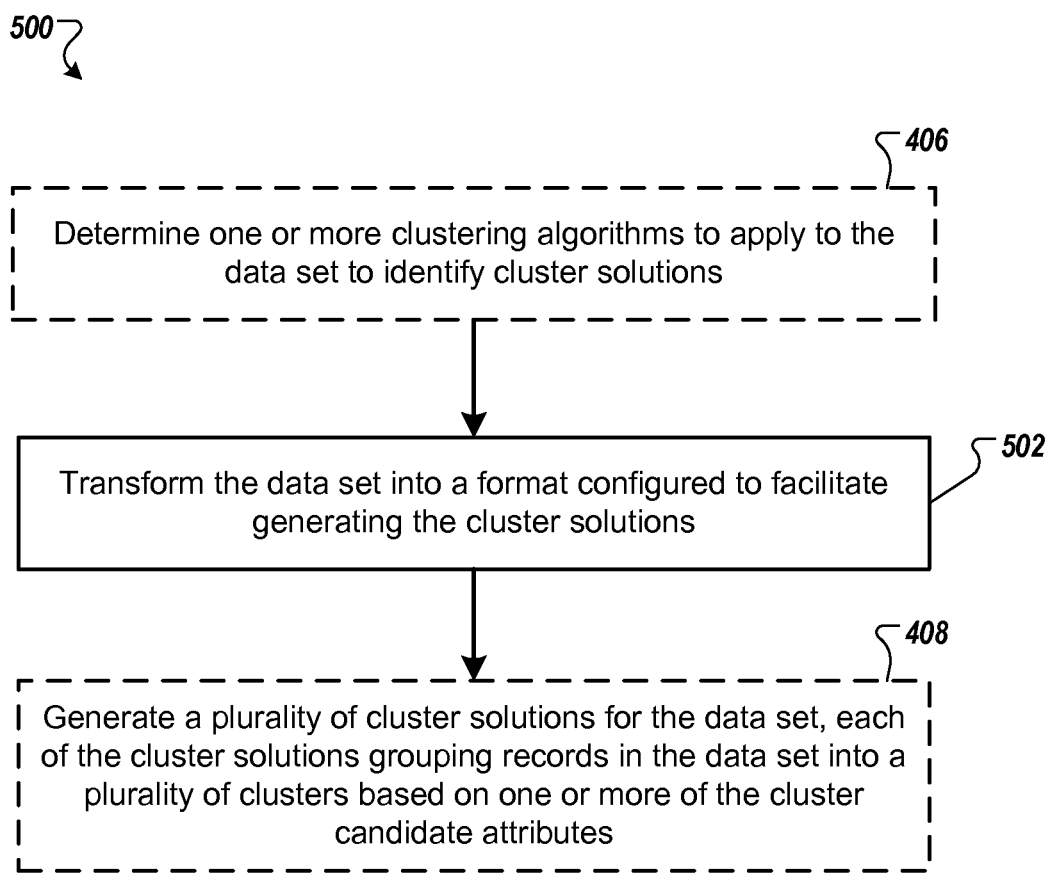
Figure 6:
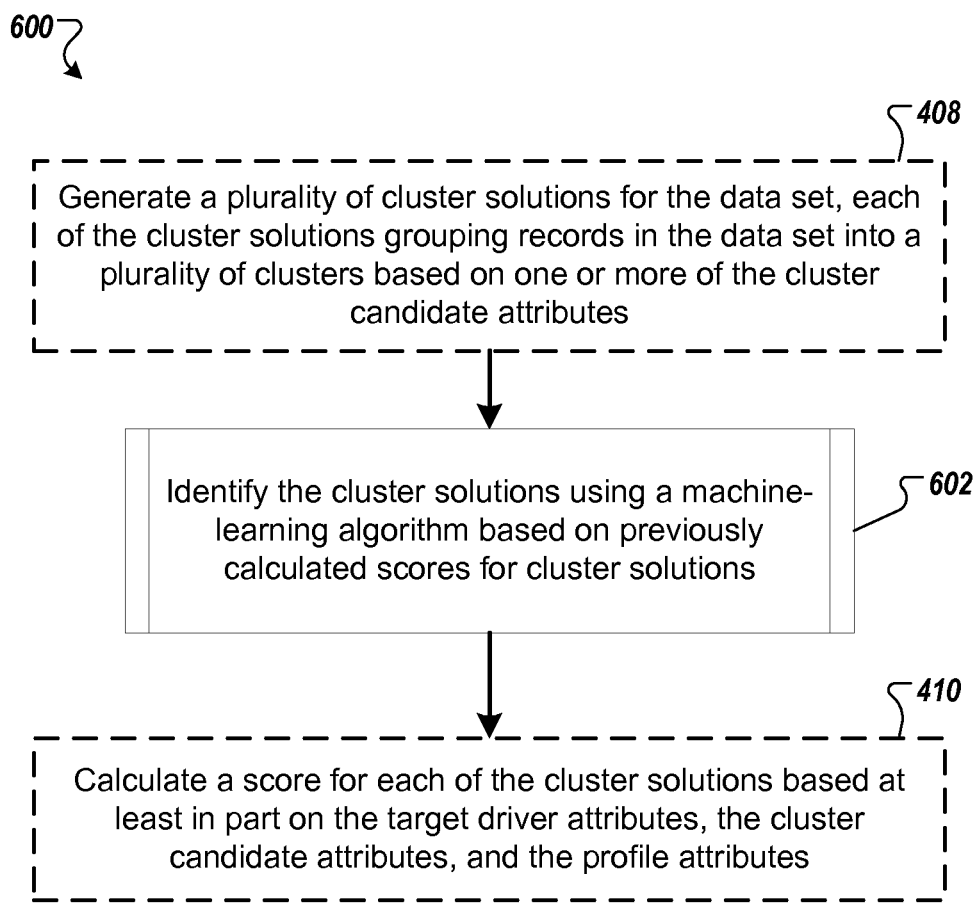

FIGS. 4 to 6 are flow charts illustrating example processes 400, 500, 600 for performing clustering and evaluation. The example processes 400, 500, 600 may be performed, for example, by system 200 in FIG. 2.

In the example process 400 in FIG. 4, the system may identify a data set for which to evaluate cluster solutions, the data set including a plurality of records each including a plurality of attributes (402). This step may be performed, for example, by the data import module 204 in FIG. 2. The system may then identify a set of target driver attributes, a set of cluster candidate attributes, and a set of profile attributes from a plurality of attributes (404). The system may determine one or more clustering algorithms to apply to the data set to identify cluster solutions (406). The system may then generate a plurality of cluster solutions for the data set, each of the cluster solutions grouping records in the data set into a plurality of clusters based on one or more of the cluster candidate attributes (408). The system may calculate a score for each of the cluster solutions based at least in part on the target driver attributes, the cluster candidate attributes, and the profile attributes (410). Steps 404 to 410 may be performed, for example, by the data management module 208 in FIG. 2 (possibly in conjunction with remote computation nodes 216). The system may then generate a user interface for presentation to a user showing the plurality of generated cluster solutions organized according to the calculated scores for each cluster solution (412). This step may be performed, for example, by the visualization module 222 in FIG. 2.

FIG. 5 illustrates an example of additional details of transforming data prior to clustering (e.g., as performed by the data management module 208 in FIG. 2). In the example process 500, after the system determines one or more clustering algorithms to apply to the data set to identify cluster solutions (e.g., as in 406 in FIG. 4), the system may transform the data set into a format configured to facilitate generating the cluster solutions (502). After transforming the data set, the system may then generate a plurality of cluster solutions for the transformed data set (e.g., as in 408 of FIG. 4). Although the example of FIG. 5 illustrates the data transformation occurring after determining clustering algorithms (406), in general, the transformation of the data set may occur at any suitable time prior to performing clustering operations on the data set.

In some cases, the transformation involves operations such as normalization, mapping categorical data to numbers, and/or replacing missing data or outliers (extreme values) with prescribed replacements. The system may provide an interface (e.g., interface 212 in FIG. 2) by which the user can create transformation rules that, when applied on the variables of the data set, map those variables to values that will be usable by the clustering process. Based on these transformation rules, data from the data source may be processed in preparation for clustering.

In some implementations, the system may use a "non-destructive" approach which allows data to be transformed while enabling reversion back to an original data state. There may be numerous benefits to the implementations described above. Some examples of benefits may include one or more of the following:

1. If a mistake is made, or if a particular transformation to a variable is not working well in the clustering solutions, the transformation may be reversed and a different transformation may be attempted instead.

2. The resulting cluster solution set (at the end of the process) may be stored along with the transformation rules that were used as inputs. This makes it possible to go back to the original data set and replicate the clustering exercise without needing to maintain the interim "transformed" data set.

3. Once a desired cluster solution has been found, the cluster solution may be exported to an external system (e.g., a data warehouse) along with the data transformation rules. That external system may then assign future data records to the various clusters by first applying the transformation rules and then scoring the resulting "processed version of the datum" against the desired cluster solution. This may enable the clustering solution to be portable.

FIG. 6 illustrates an example of additional details of generating a plurality of cluster solutions (e.g., as in 408 of FIG. 4). In the example process 600, generating a plurality of cluster solutions includes identifying the cluster solutions using a machine learning algorithm based on previously calculated scores for cluster solutions (602).

Clustering techniques such as k-means may involve unsupervised machine learning. In such techniques, the computation of a cluster solution is not tied to a metric that represents an error or a reward based on the quality of the cluster solution.

A system according to the present disclosure instead provides an improved form of machine intelligence by wrapping the clustering operations in a heuristic algorithm that uses a scoring system (e.g., based on the target drivers, the profile variable diversity and cluster density statistics from the cluster candidates) to aid in the directed search for a cluster solution(s).

Different heuristic search algorithm may be used, such as, for example, simulated annealing, or other algorithms. In some implementations, the heuristic search algorithm (e.g., simulated annealing) may be applied to a larger search to find solutions among potentially many (e.g., billions) candidate cluster solutions, and the architecture may be abstracted so that the heuristic search algorithm (e.g., simulated annealing) can be replaced by any desired search algorithm.

As such, the system may not only generate a multitude of cluster solutions (using clustering algorithms such as k-means), but also may allow a user to search for and identify particular cluster solutions that are relevant (using heuristic machine-learning search algorithms, such as simulated annealing) based on user-specified criteria (e.g., target drivers). By providing an integrated cluster generation, evaluation, and identification technique, the system may enable a more comprehensive analysis of potentially large amounts of data.

FIGS. 7 to 14 are graphs 700 to 1400 that illustrate examples of data presentation and visualization (e.g., as presented by the user interfaces 218, 224, and/or 226 in FIG. 2). The graphs in FIGS. 7 to 14 illustrate examples of displaying the progress of a heuristic solution search algorithm loop (in order to detect potential bugs in the cluster analysis) and examples of exploring the global scoring constants and examining their impact in the loop's search process. Also described is the Average Centroid Distance metric and an additional scale normalization process that may, in some implementations, improve this metric and its usefulness in the total scoring process.

Figure 7:
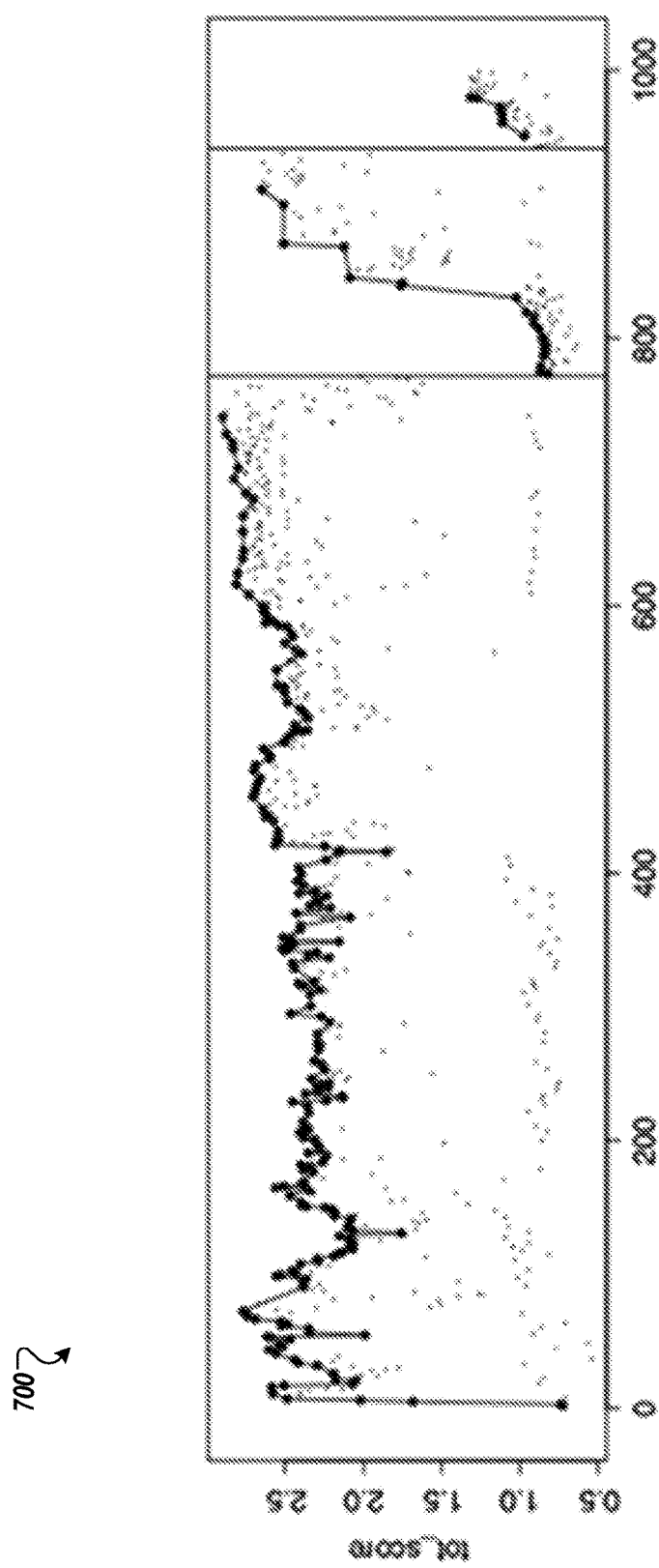
FIGS. 7-13 are graphs illustrating examples of visualizations of clustering and evaluation.

The graph 700 in FIG. 7 shows a 4-cluster solution with 1000 iterations. It shows the total combined scores at the top, followed by the three different components of the combined score: the target driver component (in the diagram, BV stands for Business Value, which is what the target driver usually represents), the grouping component (Average Centroid Distance), and the heterogeneity component (Solution Diversity Score). An example of a total score graph is shown in FIG. 7.

In this example, vertical lines at iterations 772 and 942 indicate where the heuristic solution search algorithm restarted because the non-improvement limit (in this case, 30) had been reached. The dotted line represents the score of all accepted solutions—that is, all cluster solutions that were considered an improvement over the running maximum or that were within a range of the simulated annealing's cooling tolerance. The smaller dots represent the solution scores that were not accepted by the heuristic search.

Average Centroid Distance

Figure 8:
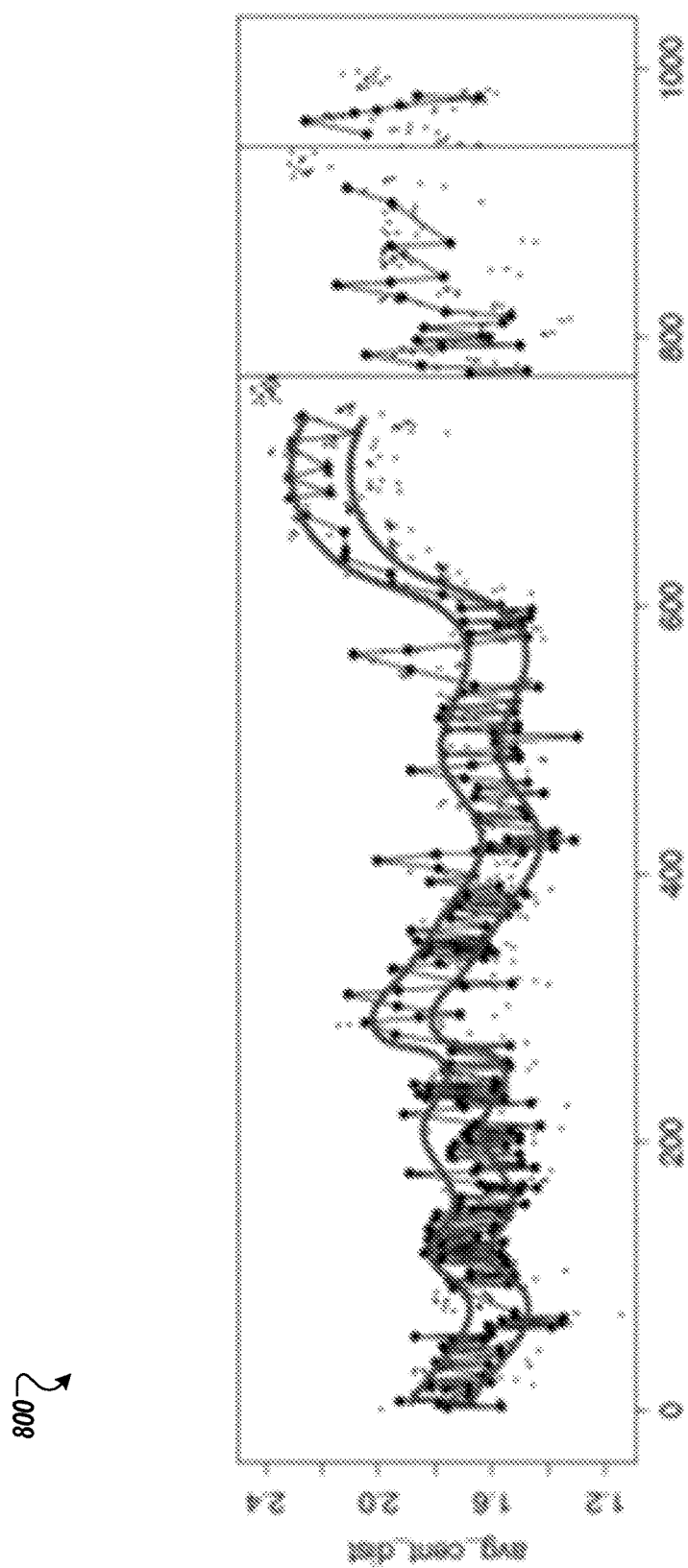

FIG. 8 shows a graph 800 illustrating an example of oscillations of the grouping score (Average Centroid Distance). Unlike the target driver score (BV) and heterogeneity score (Solution Diversity), the grouping score (Average Centroid Distance) has a "fuzziness" to it. FIG. 8 demonstrates how there appears to be an overall progress of this score, but it appears to oscillate within the range between the curved lines.

The reason for this oscillation may be explained by the fact that the cluster solutions are constantly adding and removing variables. For example, when a cluster solution has 5 variables, the average centroid distance for points in the cluster will always be about 14% than when it has 4 variables.

Scale of a Euclidean Distance

Consider a set of n data points $x_1, x_2, \ldots x_n$ each data point $x_i$ having k components $\{x_{i1}, x_{i2}, \ldots x_{ik}\}$ where each component $x_{ij}$ has been normalized so that the mean is zero and variance is 1 ($\mu=0$ and $\sigma^2=1$). For a large number n, the Euclidean center, or mean, of these data points will approach the origin at 0.

The Euclidean distance from any point $x_i$ to the origin (we will denote as $\Delta x_i$) is calculated by applying the Pythagorean theorem and taking the square root of the sum of squared components, or $$\Delta x_i = \sqrt{\sum_{j=1}^{k} x_{ij}^2} \quad (1)$$

If the components of $x_i$ ($x_{i1}$, $x_{i2}$, ..., $x_{ik}$) are distributed according to a Normal distribution ($\sim N(0,1)$), then the square of the distance $\Delta x_i^2$ will have a Chi-square ($\chi^2$) distribution with k degrees of freedom, because it is the sum of k independent normally distributed random variables.

There is a distribution Chi(k) that is the square root of a $\chi^2$ random variable with k degrees of freedom. If $\Delta x_i \sim$ Chi(x) then the expected value can be given by:

$$E\Delta x_i = \sqrt{2}\,\frac{\Gamma((k+1)/2)}{\Gamma(k/2)} \quad (2)$$

A consequence of this is that the mean of a normalized distance will be constant and will increase predictably as the dimensionality of the distance increases. As an example, for normalized distances measured in a 4-dimensional space, the average distance will be $E\Delta x = 1.88$, and in a 5-dimensional space, $E\Delta x = 2.13$, and in a 6-dimensional space $E\Delta x = 2.35$.

In some implementations, average centroid distances for cluster solutions with different dimensions cannot be directly compared, because by simply adding a new dimension to a data set, a new term $x_{k+1}^2$ must be added to the Pythagorean sum of squares.

However, these computed expected values may be used to create a scaling factor that enables a direct comparison of distances of different dimensions. Without k-means clustering (or with a clustering of only 1 cluster) an exact calculation for the expected value of distances may be obtained. In addition, since the average distances of points to their centroids is smaller than the distance to the overall center, a set of scale factors $s_1, s_2, \ldots s_k$ may be defined where $s_i$ is the expected value of the overall average distance (i.e. the square root of the overall sum of squared errors (SSE)) given by:

$$s_i = \sqrt{2}\,\frac{\Gamma((k+1)/2)}{\Gamma(k/2)} \quad (3)$$

If, for any solution of k variables, the Average Centroid Distance statistics is divided by $s_k$, a statistic is obtained that itself will fall in the range of (0,1) where 0 would represent "perfect clusters" (all points being exactly equal to the centroid) and 1 would represent no clustering.

Examining Average Distances by Number of Variables

The example graph 800 of Average Centroid Distances shown in FIG. 8 can be separated so that all k-variable solutions can be grouped together. The example graphs shown in FIG. 10 take the solutions that had 5, 6, ..., 10 variables and group them together. The y-axis label shows how many variables were selected by the heuristic solution search algorithm in the solution, and the x-axis label has the mean of the Average Centroid Distance across these solutions.

Figure 10:
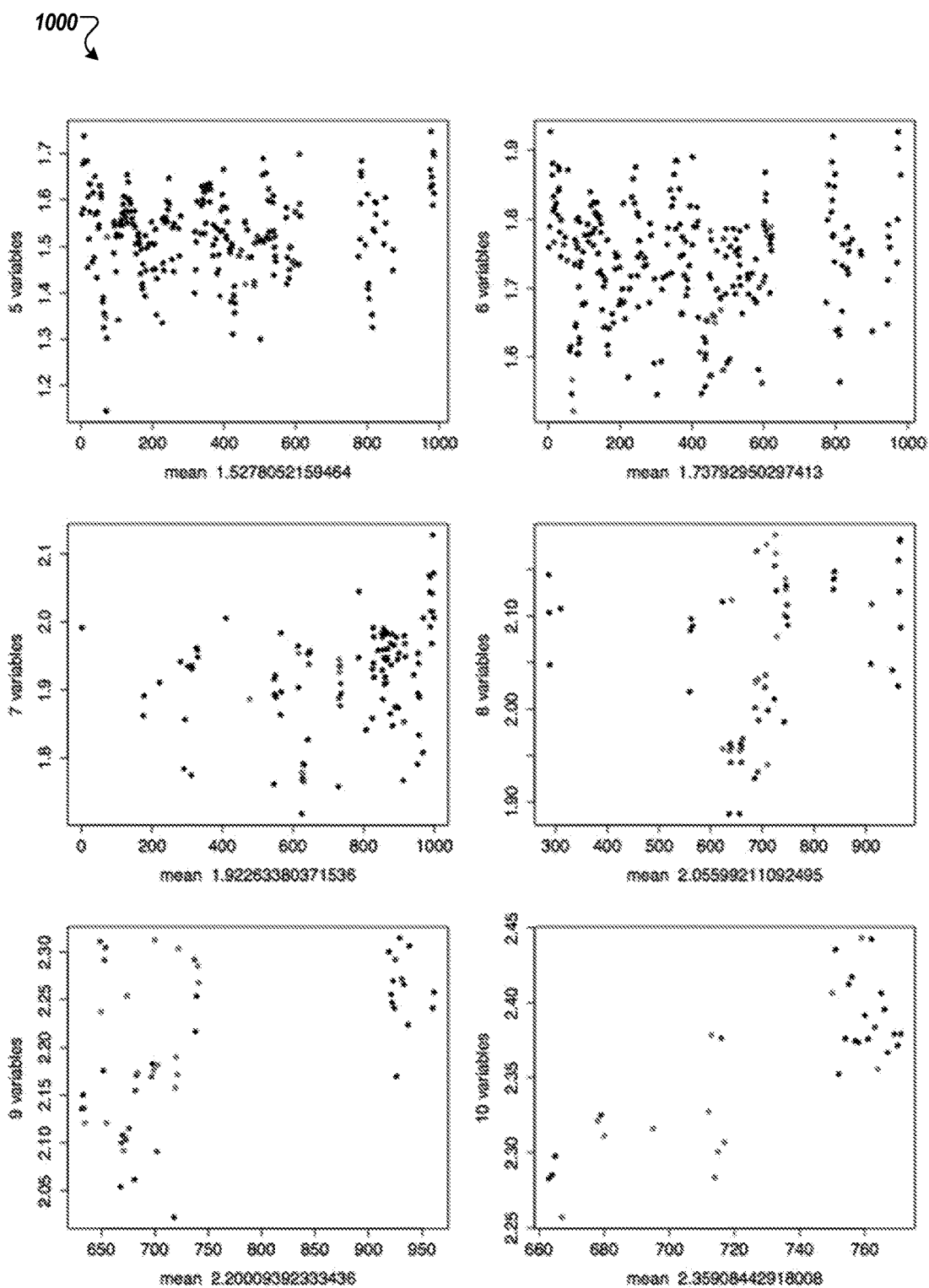

In the example graphs 1000 of FIG. 10, the lighter dots represent solutions that had a Total Score within the top 10th percentile of all accepted solutions, and the darker dots represent solutions in the top 20th percentile.

Looking at the ranges within each graph, it may be difficult to decide on a good "Average Centroid Distance Limit" that should be used to "punish" the worst solutions. For example, an Average Centroid Distance Limit of 2.0 might look good for favoring the best 8 variable solutions, but it would not punish a single 5- or 6-variable solution. Even finding a good single threshold that works reasonably for 5-variable and 6-variable solutions may be difficult.

Figure 11:
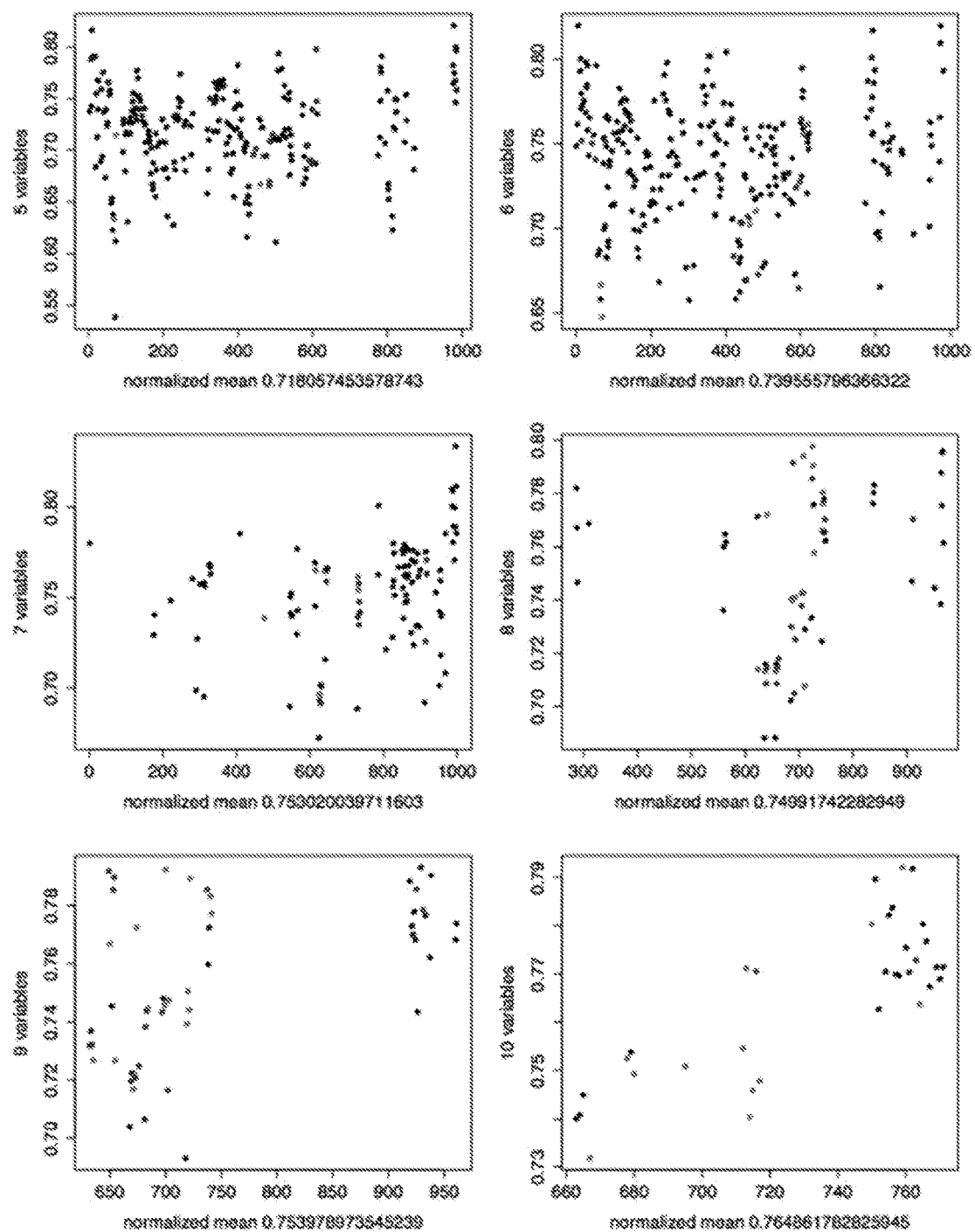

The example graphs 1100 in FIG. 11 has variable normalization enabled, applying the scaling factor to the average centroid distance calculation.

The points on the example graphs 1000, 1100 between FIGS. 10 and 11 are identical, but the y-axis ranges now have similar ranges, with a median threshold of about 0.75.

Applying the Scaled Average Distances

Figure 9:
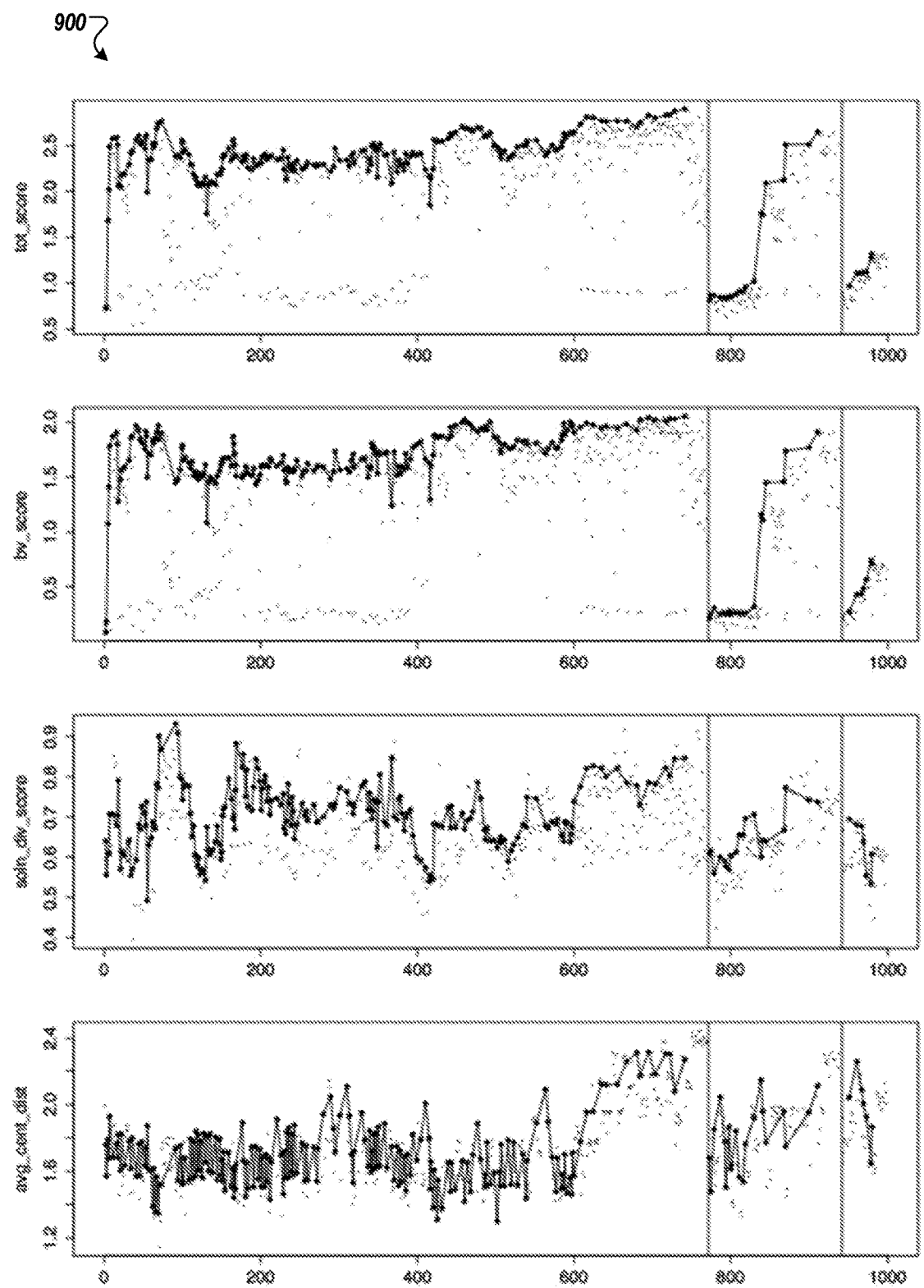

In the example curves on the graphs 900 in FIG. 9 based on the y-axis scale, the line has width ~0.2. In some examples, if most solutions have between 5 and 6 solutions, the 6-solution scores may have an average centroid distance of $s_6/s_5 = 1.10$ or 10% higher than the 5-solution scores. Since the overall scores are around 2.0, this line width of 0.2 is expected in this example.

Figure 12:
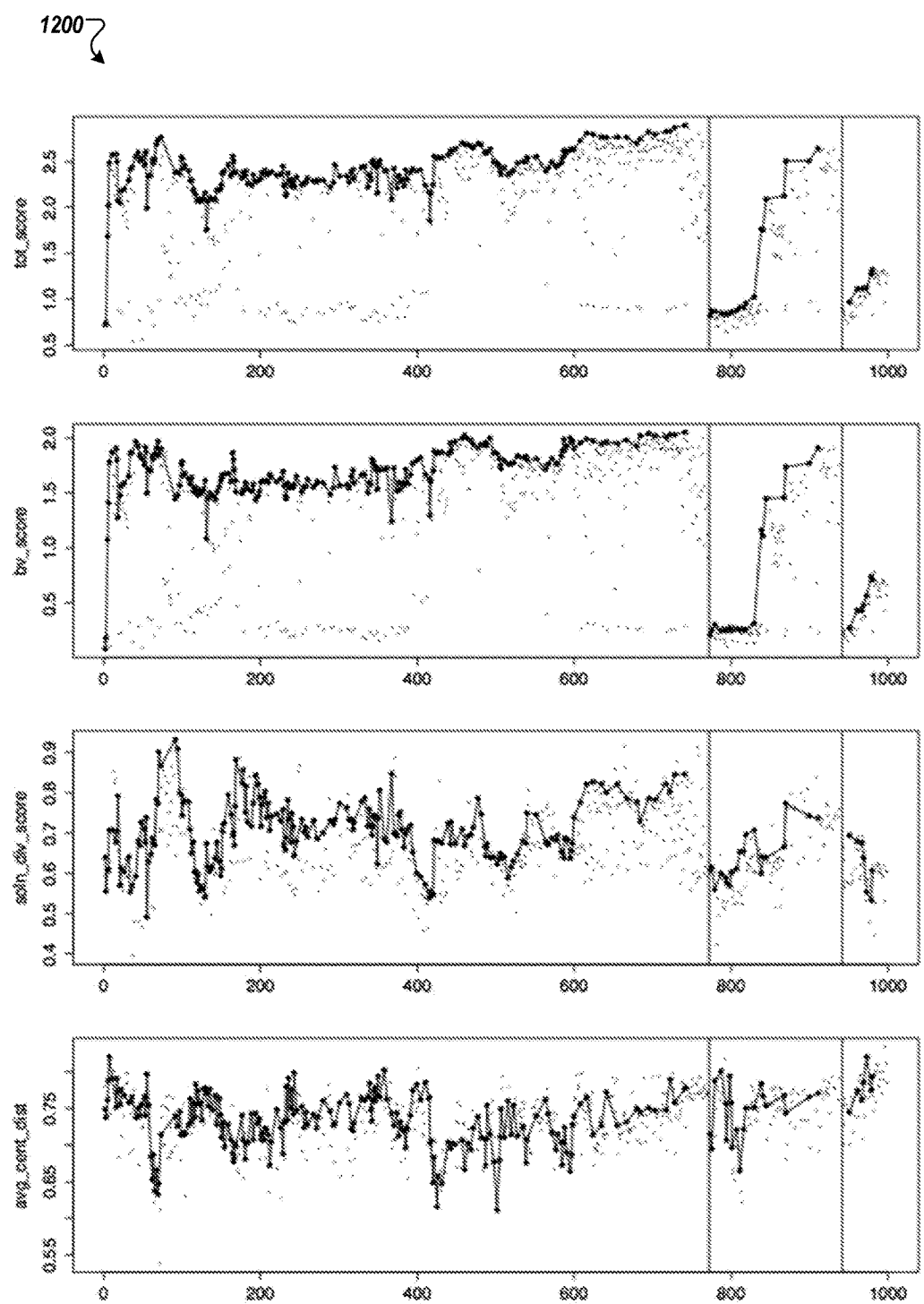

If each solution's Average Centroid Distance is scaled by the proposed scale factor, the result is shown in the example graphs 1200 of FIG. 12.

Note that the avg_cent_dist line no longer has the "fuzzy" appearance and most closely resembles the type of "random looking walk" as the Solution Diversity Score immediately above it.

Figure 13:
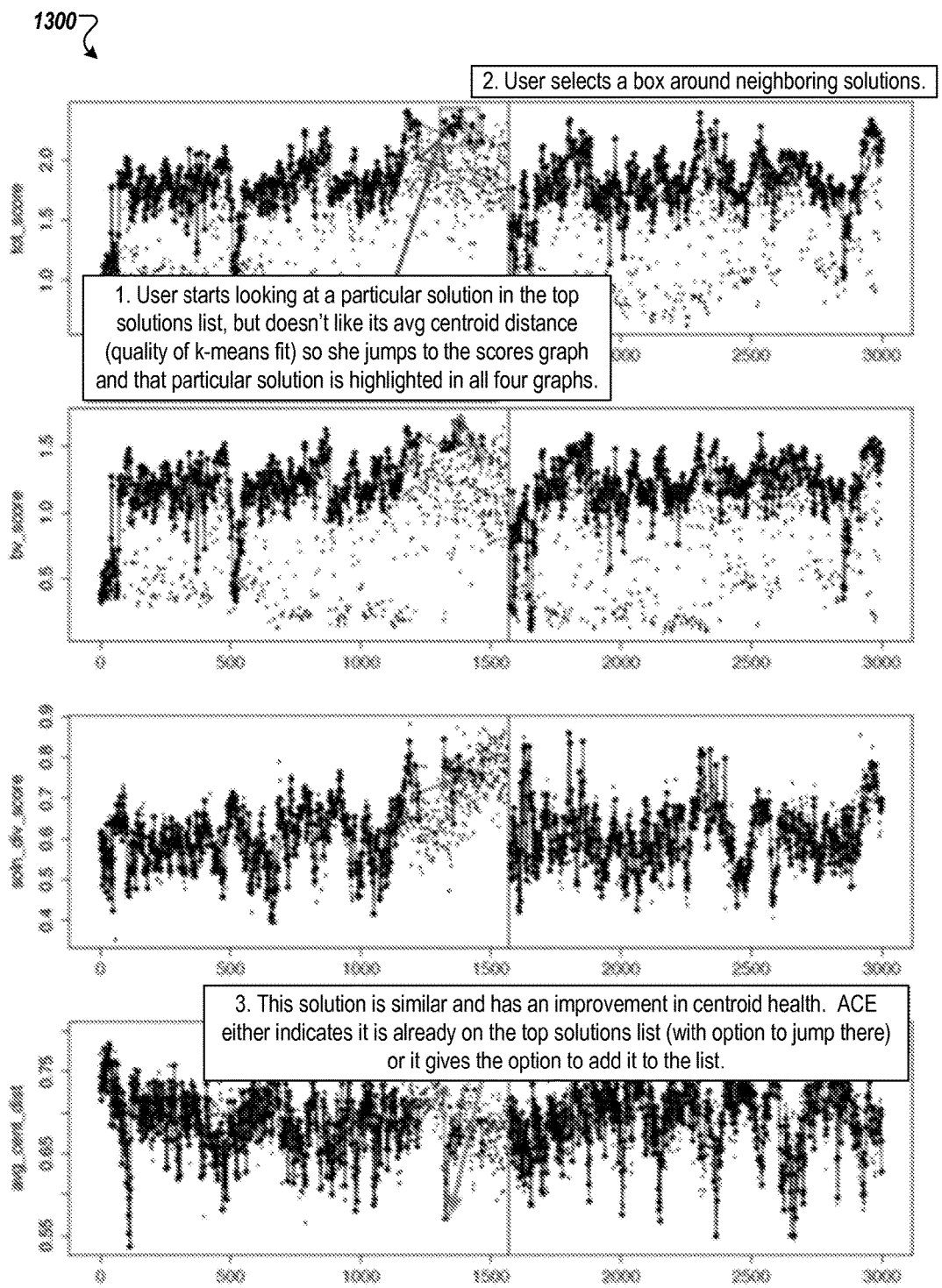

FIG. 13 shows graphs 1300 illustrating examples of enabling a user to interact with the displayed graphs (e.g., as provided by the visualization module 222 in FIG. 2). In these examples, a particular cluster solution is displayed in the top solutions list, but a user may not like the average centroid distance in that solutions (quality of k-means fit) due to large separation between points in the cluster. The user may then jumps to the scores graph and the user interface may display that particular solution as being highlighted in all four graphs.

The user interface may enable the user to select a box around neighboring solutions. This cluster solution may be similar and have an improvement in centroid distance. The system either indicates that the cluster solution is already on the top solutions list (giving the user an option to jump there) or it gives the option to add the cluster solution to the list.

In some implementations, the system may use scaling factors to determine scaled average distances in other scenarios and for other reasons. As an example, the system may use scaling factors to compute scaled average distances that account for missing data values, as described below.

Processing Data with Missing Values

In some implementations, the system may be configured to process data that has missing values. Some simpler techniques for handling data with missing values include, for example, simply excluding the data from processing or replacing the missing values with substitute values that are representative of related data, such as a median or mean of related data. However, in some scenarios, these techniques may introduce additional noise and inaccuracy that may exceed a tolerable amount.

As another alternative, the system may introduce a corrective factor to account for missing data. For example, the scaling factor introduced in the previous section may enable the system to process data even if some of the data have not been assigned values. Such scaling techniques may be used, for example, when the system determines statistics, such as averages, over a collection of data in which some of the data has missing values. The scaling factors may enable the system to harmonize the different data points in the collection and determine a sensible statistical metrics over the collection of data.

To consider a simple example of a data point that may have missing values, consider a set of n points $x_1, x_2, \ldots x_n$, where each point $x_i$ is three-dimensional with components $\{x_{i1}, x_{i2}, x_{i3}\}$ and where each component $x_{ij}$ has been scaled and normalized to have zero mean and unit variance ($\mu=0$ and $\sigma^2=1$). Assume that a particular point, $x_i$, has one or more of its components $\{x_{i1}, x_{i2}, x_{i3}\}$ missing a value.

In terms of a clustering algorithm, such as k-means clustering, the missing data values may be handled by simply ignoring the missing values in the distance computation and clustering assignments. For example, assume there are a number p "clusters" $C_1, C_2, \ldots, C_p$ whose centroids (that is, center points) are given by the three-dimensional points $c_1, c_2, \ldots c_p$, respectively. The standard k-means clustering algorithm assigns a given point $x_i$ to a particular cluster as follows: it first computes the Euclidean distance between that point $x_i$ and each of the centroids $c_1, c_2, \ldots, c_p$ and then it chooses the cluster whose distance to $x_i$ is the smallest. These Euclidean distances are given by the standard Pythagorean formula:

$$\Delta x_i = \sqrt{\Sigma_{j=1}^3 (x_{ij} - c_j)^2} \quad (4)$$

If one or more of the components $\{x_{i1}, x_{i2}, x_{i3}\}$ of $x_i$ is missing a value, then the system may nonetheless be able to determine a cluster assignment by modifying the traditional clustering algorithm to compute an approximate distance, in a reduced number of dimensions, from the point $x_i$ to each centroids $c_1, c_2, \ldots, c_p$ and determining the closest centroid. As such, the cluster assignment of the point $x_i$ can still be calculated even if one or more of the components $\{x_{i1}, x_{i2}, x_{i3}\}$ are missing values. For example, if the first component $x_{i1}$ of a three-dimensional vector were missing a value, then the system may still compute the distances $\Delta x_i$ by omitting the first element, and determining the modified two-dimensional distance:

$$\Delta x_i = \sqrt{\Sigma_{j=2}^3 (x_{ij} - c_j)^2} \quad (5)$$

The system may then select the cluster whose two-dimensional centroid distance is the smallest.

However, the problem becomes more difficult when computing statistical quantities that involve an aggregation of different data points, some of which may have missing values. In particular, whereas standard cluster assignment algorithms, such as the k-means cluster assignment process described above, may be unaffected by missing data values, difficulties may arise when computing statistics, such as average centroid distances, that are based on multiple distance measurements. In such scenarios, simply using reduced-dimensional distances may not be sufficient, and the system may be configured to use scaling factors to account for the missing values and to harmonize different data points.

For example, consider the average distance between points $x_1, x_2, \ldots x_n$ and a single centroid c, given by $$\overline{\Delta x_1} = \frac{1}{n} \sum_{i=1}^{n} \sqrt{\sum_{j=1}^{3} (x_{ij} - c_j)^2} \quad (6)$$

However, if some of the points $x_i$ are missing values for one or more of their components, then the formula in Equation (6) would be a mixture of one-, two-, and three-dimensional measurements. As explained above, higher-dimensional distances are generally larger than lower-dimensional distances because of their extra components. Therefore, in the average distance formula given above, data points that have missing values would typically have smaller distance values, and these smaller values would tend to bias the average distance towards a smaller average than would otherwise be accurate.

To address this problem, the system may use scaling factors to introduce a corrective factor that accounts for the artificially small distances created by missing data values. For example, the system can use the scaling factors $s_1, s_2, \ldots s_k$ given in the previous section:

$$s_i = \sqrt{2} \frac{\Gamma((k+1)/2)}{\Gamma(k/2)} \quad (7)$$

These scaling factors would "normalize" the dimensionality between the distance measures in order to compensate for the missing data values.

Consider a k-dimensional point so that each point $x_i$ has components $\{x_{i1}, x_{i2}, \ldots, x_{ik}\}$. Consider a set M to represent those components with missing values, so $x_{ij} \in M$ only if component j is missing. Also let the value m represent the number of missing components. (It follows that there will be (k−m) non-missing components.)

Define a corrected distance $\Delta^c x_i$ to be $$\Delta^c x_i = \frac{s_k}{s_{k-m}} \sqrt{\sum_{j \notin M} (x_{ij} - c_j)^2} = \frac{s_k}{s_{k-m}} \Delta x_i \quad (8)$$

so that the distance is effectively inflated by a scaling factor $s_k/s_m$.

As an example, if the points $x_1, x_2, \ldots x_n \in R^7$ (i.e., points in a seven-dimensional space) and a point $x_i$ has missing data for two of its seven components (i.e. m=2), then the system would calculate the distance $\Delta x_i$ from a centroid using Euclidean distance across the five existing (non-missing) components, and then would inflate the distances by of factor of $s_k/s_m$, calculated by $$\frac{s_k}{s_{k-m}} = \frac{\sqrt{2} \frac{\Gamma((k+1)/2)}{\Gamma(k/2)}}{\sqrt{2} \frac{\Gamma((k-m+1)/2)}{\Gamma((k-m)/2)}} = \frac{\Gamma((k+1)/2)\Gamma((k-m)/2)}{\Gamma((k-m+1)/2)\Gamma(k/2)} \quad (9)$$

Substituting k=7 and k−m=5 in Equation (9), the system would calculate $\Delta^c x_i$ by multiplying $\Delta x_i$ by the scaling factor:

$$\frac{s_7}{s_5} = \frac{\Gamma(4)\Gamma(5/2)}{\Gamma(3)\Gamma(7/2)} = 1.2 \quad (10)$$

Therefore, in this example, the system would inflate the reduced 5-dimensional distance by 20% to scale it to a 7-dimensional equivalent.

Therefore, in some implementations, the system may be configured to automatically detect missing data component values, and compute modified distances that account for the missing data by inflating distances by the appropriate scaling factor, as described above.

Compound Variables

In some implementations, one or more components of a data point may be related to each other, and the system may be configured to group those components and process them together as a single compound variable. As an example, if a data point $x_i$ has components $\{x_{i1}, x_{i2}, x_{i3}, \ldots, x_{ik}\}$, and if the system determines that the second and third components, $x_{i2}$ and $x_{i3}$, should be treated as a compound variable, then the system may instead represent the data point $x_i$ as having components $\{x_{i1}, x_{i2}, \ldots, x_{ik-1}\}$, where the compound variable $x_{i2}$ represents both $x_{i2}$ and $x_{i3}$. A specific example is provided below, in the context of geolocation data.

Geolocation Data

Consider a data set $x_1, x_2, \ldots, x_n$ where each data point $x_i$ has components $\{x_{i1}, x_{i2}, x_{i3}, \ldots, x_{ik}\}$, and where each component $x_{ij}$ represents some sort of measure. For example, the data point $x_i$ could represent a person and the component $x_{i1}$ might be a measure of a person's height, $x_{i2}$ might be a measure of a person's annual income, and $x_{i3}$ might be a measure of the average weekly amount of money that the person spends on particular items, such as groceries, etc.

As explained above, in some implementations, the system may be configured to calculate a k-means solutions by selectively using different subsets of component variables. For example, the system's search algorithm may decide to select four of the k components $\{x_{i1}, x_{i2}, x_{i3}, \ldots, x_{ik}\}$ to compute a clustering solution, for example, using the four components $\{x_{i2}, x_{i5}, x_{i6}, x_{i13}\}$.

However, if the data point $x_i$ corresponds to geolocation data, then $x_{i4}$ may represent the longitude and $x_{i5}$ may represent the latitude. In such scenarios, the selection of the latitude component $x_{i5}$ as part of the four components to be processed, but not the corresponding longitude component $x_{i4}$, may cause problems for at least two reasons.

First, by only using one dimension of geolocation, such as longitude and not latitude, the clustering solution may be based on an inaccurate measure of actual distance. For example, if latitude were not considered in a clustering computation, then two people living in Texas and North Dakota would appear to have a very small distance between them, even though in reality they are far apart, because their longitudes are similar.

Second, due to the spherical shape of the Earth, distances between two longitudes are much greater near the equator than near the poles.

The system may be configured, in some implementations, to address this problem by identifying geolocation data as a compound variable. For example, the system may calculate distances for these compound variables using polar distance calculations.

Storing Geolocation as a Compound Variable

As a particular example, rather than storing a longitude in component $x_{i4}$ and the latitude in $x_{i5}$, the system may be configured to store both latitude and longitude in a single component $x_{i4}$ by making that component a complex variable with the longitude and latitudes stored as the real and imaginary parts. In such scenarios, the component may be represented $x_{i4}=a+bi$ where a is the latitude and b is the longitude. During this process, the system may also convert the measure from degrees to radians so that a location of 41° N and 92° W would be converted to 0.71+4.68i (consider North and East to be the positive directions, so that 92° W=360°−92°=268°=4.68 radians.)

The system may then be configured to select geolocation values together as a compound variable. The use of complex numbers is merely for conceptualization, however, and in practice the system may utilize any suitable data structure that allows a variable to have multiple components.

Euclidean Distances for Clustering Algorithms

Using compound variable, the system that computes distances for clustering algorithms such as k-means will recognize the use of a complex value (or other similar two-part data structure). In such scenarios, instead of using the standard distance calculation:

$$\Delta x_i = \sqrt{\Sigma_{j=1}^k (x_{ij}-c_j)^2} \qquad (11)$$

The system may instead separate the geolocation components into a set G and compute their distance using a polar distance function $g^\Delta(x,c)$.

If $x=\theta_1+i\phi_1$ and the centroid component is $c=\theta_2+i\phi_2$, then the polar distance function $g^\Delta(x,c)$ may be based on the following computation for the distance:

$$g^\Delta(x_{ij},c_j)=g^\Delta(\theta_1+i\phi_1,\theta_2+i\phi_2)=2-2\cos\theta_1\cos\theta_2\cos(\phi_1-\phi_2)-2\sin\theta_1\sin\theta_2 \qquad (12)$$

The distance for a data point $x_i$ will then become:

$$\Delta x_i = \sqrt{R_j \Sigma_{j \in G} g^\Delta(x_{ij},c_j)^2 + \Sigma_{j \notin G}(x_{ij}-c_j)^2} \qquad (13)$$

In equation (13), above, the $g^\Delta(x,c)$ component distances are multiplied by a scaling factor $R_j$ that may normalize the geolocation data. This factor may be computed by first calculating the average (center) geographical point of the entire data set, and then computing the standard deviation for the distances between each point and that center.

As in the missing-data compensation implementation described in the previous section, the basic distance computation algorithms may be enhanced so that geolocation components are automatically detected and the appropriate spherical distance calculations are applied.

FIGS. 14-18 are diagrams illustrating examples of screen shots that may be displayed by a system that performs integrated clustering and evaluation.

Figure 14:
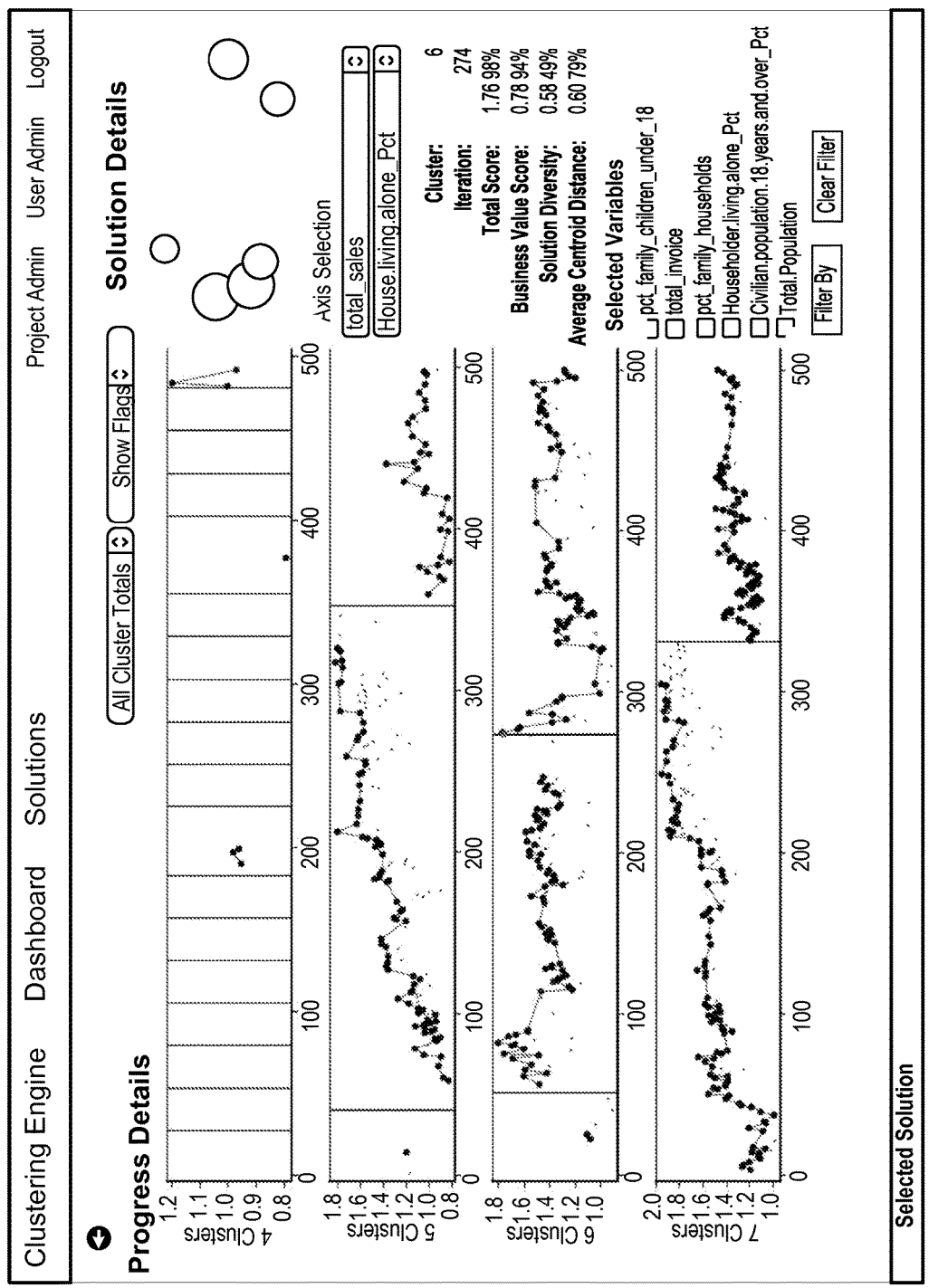
FIGS. 14-18 are diagrams illustrating examples of screen shots that may be displayed by a system that performs integrated clustering and evaluation.

FIG. 14 illustrates an example of a screen shot that may be displayed by the system for a top-level Solution Explorer showing 4-cluster, 5-cluster, 6-cluster, and 7-cluster solutions, shown in separate graphs. Each graph illustrates the progression of iterative search for solutions for each size of cluster. Each data point in the four graphs representing one possible solution that was obtained. The vertical axis of the four graphs corresponds to the "overall quality score" that is used in the evaluation process, e.g., using artificial intelligence and/or heuristic search. The horizontal axis is the number of iterations that the evaluation process has attempted. In this example, the displayed screen shot indicates no stable solutions for 4-cluster solutions, as shown in the top graph of FIG. 14. In particular, the vertical lines in the 4-cluster solution graph signify failures to find a new acceptable solution after a number of iterations (e.g., 25 iterations) on a search. For more clusters, such as five, six, and seven in this example, the screen shot in this example indicates better stability. For example, the 7-cluster solution graph illustrated at the bottom of the screen shot in FIG. 14 shows better overall stability for the data set, as the system is better able to converge to a solution before starting a new set of iterations, indicated by each vertical line.

Figure 15:
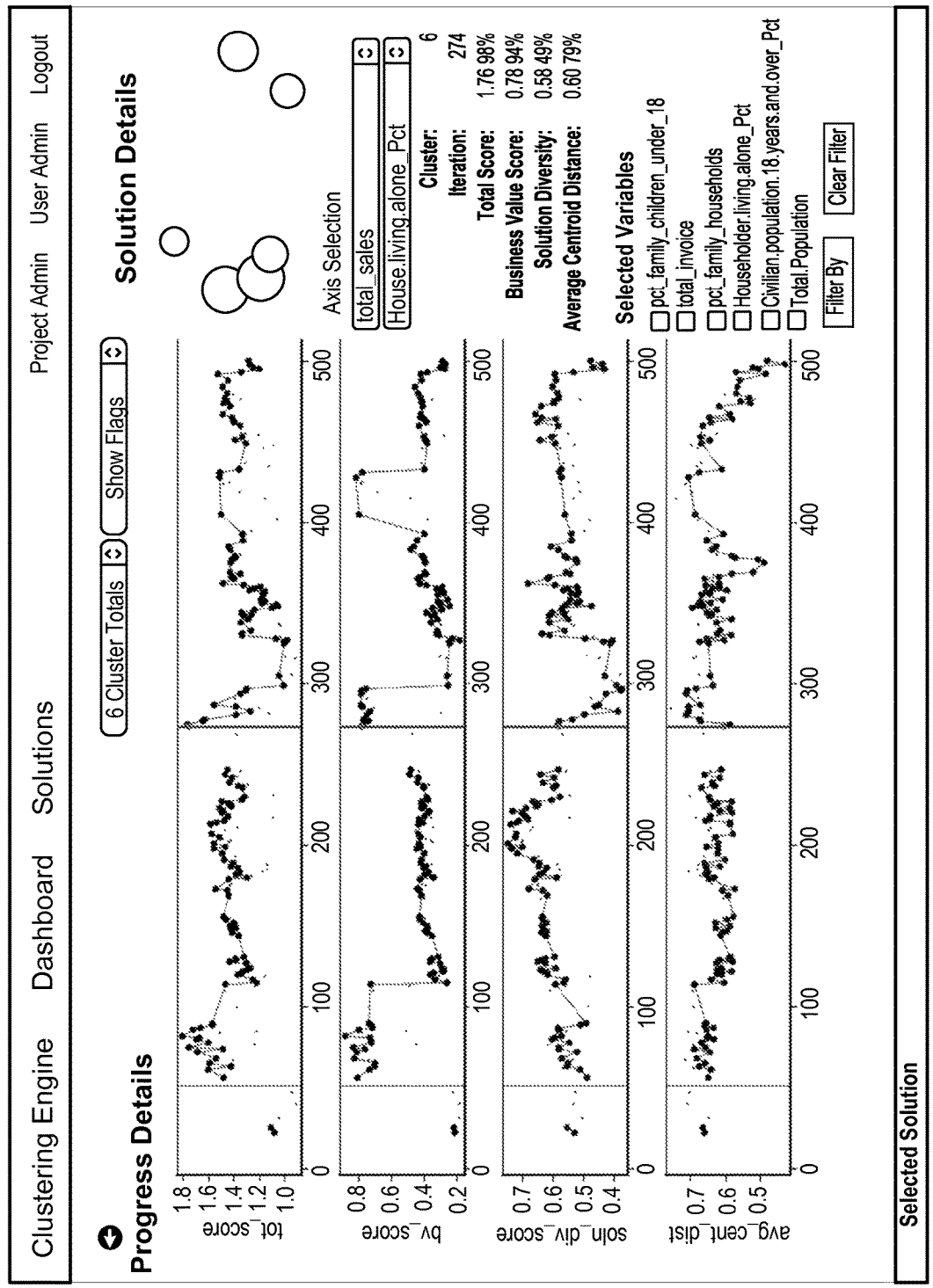

FIG. 15 illustrates an example of a screen shot showing details of 6-cluster solutions. The top graph in this example illustrates the total score on the vertical axis, and is the same as the third graph that was displayed in FIG. 14 for 6-cluster solutions. The other three graphs in this example are outputs of some individual components of the evaluation process. For example, the second graph illustrates the amount of differentiation across the target drivers, represented by the vertical axis labeled "bv_score." The third graph illustrates the amount of profile diversity between the individual clusters, or the amount of heterogeneity in the data between clusters, represented by the vertical axis labeled "soln_div_score." The fourth graph illustrates the average centroid distance in the clusters, or amount of compactness of the clusters, represented by the vertical axis labeled "avg_centroid_dist." For the fourth graph, a lower score indicates better performance, as more compact clusters tend to yield fewer errors in mapping observations to one of the clusters. In this example, for the particular solution being viewed, those variables and/or attributes that chosen for that solution may be displayed as a list on the right side of the screen shot under "Selected Variables." Below the list of selected variables may be displayed one or more buttons that enable the user to perform various filtering operations on the solutions. In this example, two buttons are displayed, a "Filter By" button and a "Clear Filter" button.

Figure 16:
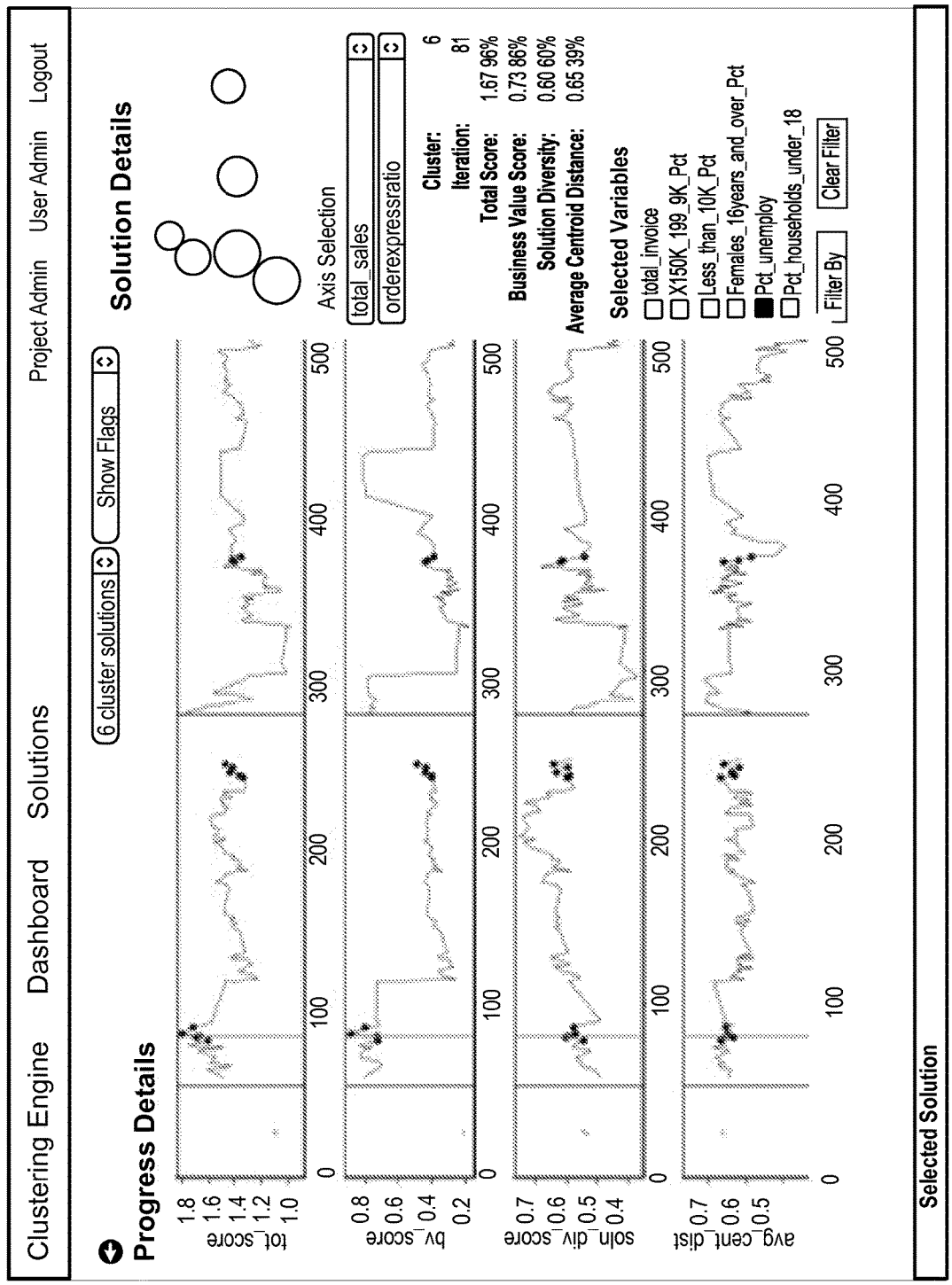

FIG. 16 illustrates an example of a screen shot that may be displayed if a user clicks on the "Filter By" button that was illustrated in FIG. 15, after selecting one or more of the variables in the corresponding list. The system performs filtering on the set of solutions displayed in FIG. 15 based on the variables selected by the user. The example in FIG. 16 shows the resulting data points that remain after the filtering, each data point representing one possible solution of the 6-cluster solutions that incorporated the selected variable of "% unemployment."

Figure 17:
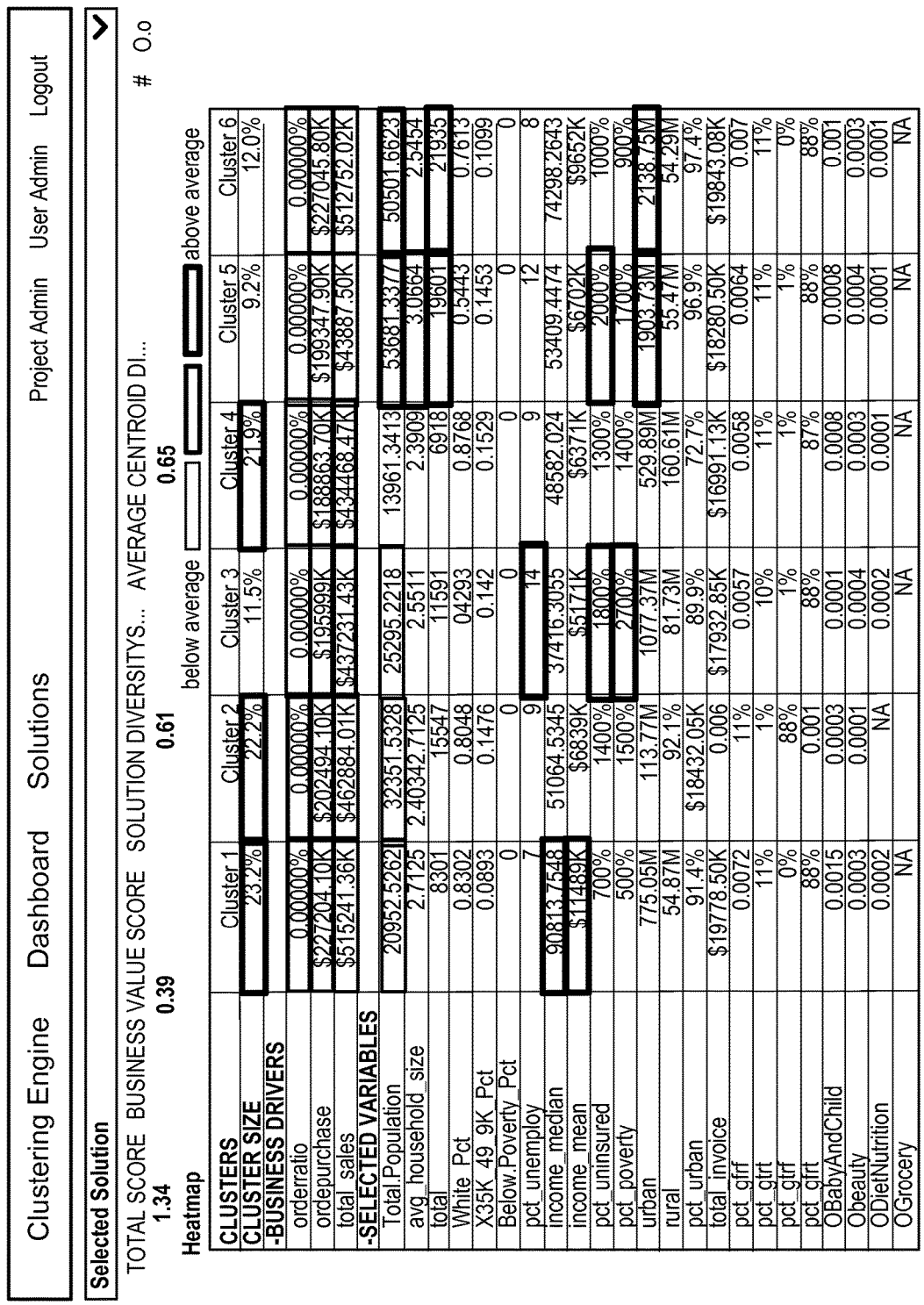

FIG. 17 illustrates an example of a screen shot of a detailed breakdown of each of the six clusters in a particular 6-cluster solution. This data may correspond, for example, to one of the data points in FIG. 14, 15, or 16. The displayed data may incorporate appropriate visual representations, such as color-coding, shading, or other visual techniques, to represent which clusters have particularly higher or lower values for the variable in question, corresponding to a particular row in the table of FIG. 17. Such visual differentiation may enable a practitioner to quickly understand how each solution splits up the overall population of the data set.

Figure 18:
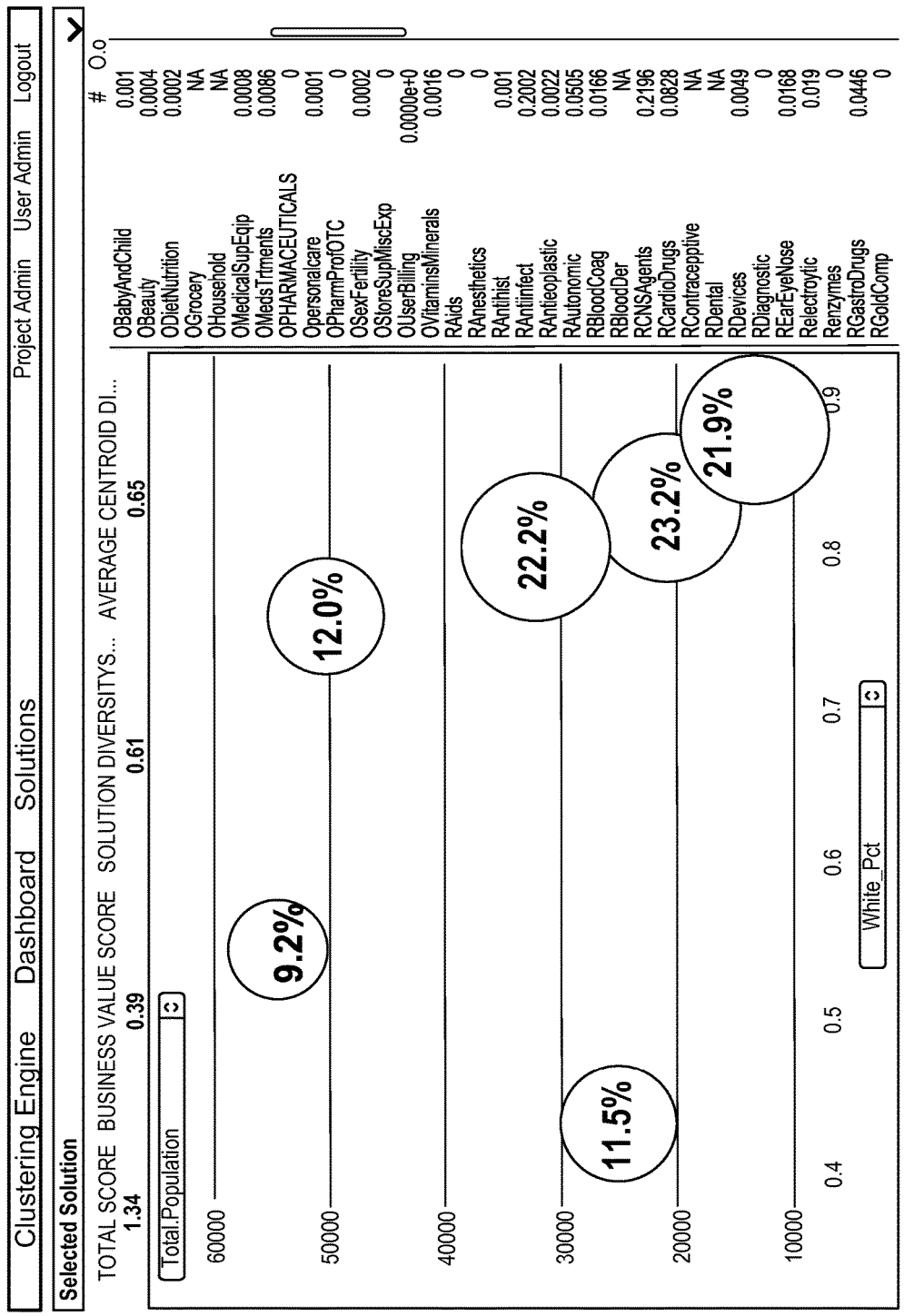

FIG. 18 illustrates an example of a screen shot of a graphical display of the six clusters. In this example, the system may enable a user to select the vertical and horizontal axes between the target drivers or the selected variables, and display the clusters as spheres on the selected axes. This may enable the user to visually determine how well the spheres spread across the total range of values of the selected target drivers or selected variables. In some implementations, if a user selects one of the clusters, then the system may display the same detailed numerical profile of that cluster across all of the variables.

Figure 19:
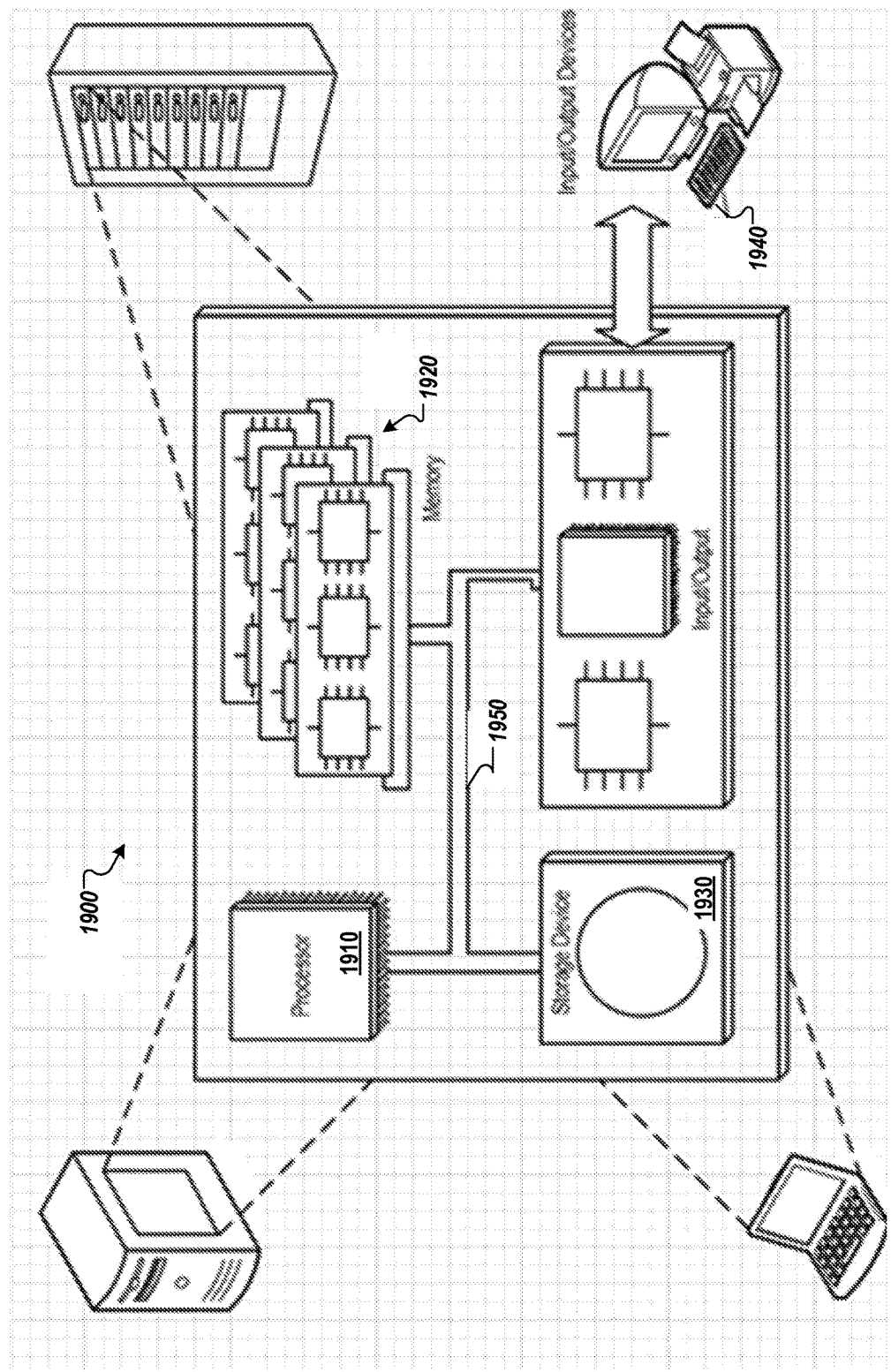
FIG. 19 is a schematic diagram of an example of a computer system that can be used for the operations described in association with the techniques described herein.

FIG. 19 is a schematic diagram of an example of a computer system 1900 that can be used for the operations described in association with the techniques described herein.

The system 1900 includes a processor 1910, a memory 1920, a storage device 1930, and an input/output device 1940. Each of the components 1910, 1920, 1930, and 1940 are interconnected using a system bus 1950. The processor 1910 is capable of processing instructions for execution within the system 1900. In one implementation, the processor 1910 is a single-threaded processor. In another implementation, the processor 1910 is a multi-threaded processor.

The processor 1910 is capable of processing instructions stored in the memory 1920 or on the storage device 1930 to display graphical information for a user interface on the input/output device 1940.

The memory 1920 stores information within the system 1900. In one implementation, the memory 1920 is a computer-readable medium. In one implementation, the memory 1920 is a volatile memory unit. In another implementation, the memory 1920 is a non-volatile memory unit. The processor 1910 and the memory 1920 may perform data manipulation and validation, including execution of data quality jobs.

The storage device 1930 is capable of providing mass storage for the system 1900. In one implementation, the storage device 1930 is a computer-readable medium. In various different implementations, the storage device 1930 may be a floppy disk device, a hard disk device, an optical disk device, or a tape device. The storage device 1930 may store monitoring data collected and data quality rule representations.

The input/output device 1940 provides input/output operations for the system 1900. In one implementation, the input/output device 1940 includes a keyboard and/or pointing device. In another implementation, the input/output device 1940 includes a display unit for displaying graphical user interfaces. The input/output device 1940 may be used to perform data exchange with source and target data quality management and/or processing systems.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method for performing clustering solution evaluation as a service using a cloud infrastructure, comprising:
    receiving, by one or more data import servers of a cloud-based, clustering solution system that includes (i) the one or more data import servers, (ii) one or more data management servers, (iii) one or more computation management servers, (iv) one or more computation node servers, (v) one or more visualization module servers, and (vi) one or more solution export module servers, and from a client device of an external system that is external to the cloud-based clustering solution system, a data set for which to evaluate cluster solutions, the data set including a plurality of records each including a plurality of attributes;
    identifying, by one or more data management servers of the cloud-based, clustering solution system, a set of target driver attributes, a set of cluster candidate attributes, and a set of profile attributes from the plurality of attributes;
    determining, by one or more computation management servers of the clustering solution system, one or more clustering algorithms to apply to the data set to identify cluster solutions;
    generating, by one or more computation node servers of the clustering solution system, a plurality of cluster solutions for the data set, each of the cluster solutions grouping records in the data set into a plurality of clusters based on one or more of the cluster candidate attributes;
    calculating, for each of the cluster solutions and by the one or more computation management servers of the clustering solution system, an aggregated score based at least in part on a target driver score that reflects a degree to which a clustering produced by the cluster solution covers the target driver attributes, a cluster candidate score that reflects a tightness to which the clustering produced by the cluster solution groups the cluster candidate attributes, and a profile variable score that reflects a heterogeneity of the clustering produced by the cluster solution across both the cluster candidate attributes and the profile attributes;
    generating, by the one or more visualization module servers of the clustering solution system, a user interface for presentation to a user showing the plurality of generated cluster solutions organized according to the calculated score for each cluster solution;
    selecting, by the one or more computation management servers of the clustering solution system, a particular cluster solution based on the scores; and
    providing, by the one or more export module servers of the clustering solution system, the particular cluster solution to the client device of the external system that is external to the cloud-based clustering solution system, for use in assigning new data records that were not previously received by cloud-based clustering solution system to the plurality of clusters that were previously generated by the one or more computation node servers using the particular cluster solution, without requiring further intervention by the clustering solution system.

2. The method of claim 1, wherein generating the plurality of cluster solutions for the data set includes identifying the cluster solutions using a machine-learning algorithm based on previously calculated scores for cluster solutions.

3. The method of claim 1, further comprising, while generating the plurality of cluster solutions, presenting a report to a user showing generated cluster solutions and allowing the user to change the sets of attributes associated with the data set.

4. The method of claim 1, wherein the calculated score for each cluster solution includes a weighted average of the target driver score, the cluster candidate score, and the profile variable score.

5. The method of claim 1, further comprising, before generating the cluster solutions, transforming the data set into a format configured to facilitate generating the cluster solutions.

6. A non-transitory, computer-readable medium storing instructions operable when executed to cause at least one processor to perform operations comprising:
    receiving, by one or more data import servers of a cloud-based, clustering solution system that includes (i) the one or more data import servers, (ii) one or more data management servers, (iii) one or more computation management servers, (iv) one or more computation node servers, (v) one or more visualization module servers, and (vi) one or more solution export module servers, and from a client device of an external system that is external to the cloud-based clustering solution system, a data set for which to evaluate cluster solutions, the data set including a plurality of records each including a plurality of attributes;
    identifying, by one or more data management servers of the cloud-based, clustering solution system, a set of target driver attributes, a set of cluster candidate attributes, and a set of profile attributes from the plurality of attributes;

determining, by one or more computation management servers of the clustering solution system, one or more clustering algorithms to apply to the data set to identify cluster solutions;

generating, by one or more computation node servers of the clustering solution system, a plurality of cluster solutions for the data set, each of the cluster solutions grouping records in the data set into a plurality of clusters based on one or more of the cluster candidate attributes;

calculating, for each of the cluster solutions and by the one or more computation management servers of the clustering solution system, an aggregated score based at least in part on a target driver score that reflects a degree to which a clustering produced by the cluster solution covers the target driver attributes, a cluster candidate score that reflects a tightness to which the clustering produced by the cluster solution groups the cluster candidate attributes, and a profile variable score that reflects a heterogeneity of the clustering produced by the cluster solution across both the cluster candidate attributes and the profile attributes;

generating, by the one or more visualization module servers of the clustering solution system, a user interface for presentation to a user showing the plurality of generated cluster solutions organized according to the calculated score for each cluster solution;

selecting, by the one or more computation management servers of the clustering solution system, a particular cluster solution based on the scores; and providing, by the one or more export module servers of the clustering solution system, the particular cluster solution to the client device of the external system that is external to the cloud-based clustering solution system, for use in assigning new data records that were not previously received by cloud-based clustering solution system to the plurality of clusters that were previously generated by the one or more computation node servers using the particular cluster solution, without requiring further intervention by the clustering solution system.

7. The computer-readable medium of claim 6, wherein generating the plurality of cluster solutions for the data set includes identifying the cluster solutions using a machine-learning algorithm based on previously calculated scores for cluster solutions.

8. The computer-readable medium of claim 6, the operations further comprising, while generating the plurality of cluster solutions, presenting a report to a user showing generated cluster solutions and allowing the user to change the sets of attributes associated with the data set.

9. The computer-readable medium of claim 6, wherein the calculated score for each cluster solution includes a weighted average of the target driver score, the cluster candidate score, and the profile variable score.

10. The computer-readable medium of claim 6, the operations further comprising, before generating the cluster solutions, transforming the data set into a format configured to facilitate generating the cluster solutions.

11. A cloud-based, clustering solution system for performing clustering solution evaluation as a service using a cloud infrastructure, the system including (i) one or more data import servers, (ii) one or more data management servers, (iii) one or more computation management servers, (iv) one or more computation node servers, (v) one or more visualization module servers, and (vi) one or more solution export module servers, comprising:

memory for storing data; and one or more processors operable to perform operations comprising:

receiving, from a client device of an external system that is external to the cloud-based clustering solution system and by the one or more data import servers, a data set for which to evaluate cluster solutions, the data set including a plurality of records each including a plurality of attributes;

identifying, by one or more data management servers, a set of target driver attributes, a set of cluster candidate attributes, and a set of profile attributes from the plurality of attributes;

determining, by one or more computation management servers, one or more clustering algorithms to apply to the data set to identify cluster solutions;

generating, by one or more computation node servers, a plurality of cluster solutions for the data set, each of the cluster solutions grouping records in the data set into a plurality of clusters based on one or more of the cluster candidate attributes;

calculating, for each of the cluster solutions and by the one or more computation management servers, an aggregated score based at least in part on a target driver score that reflects a degree to which a clustering produced by the cluster solution covers the target driver attributes, a cluster candidate score that reflects a tightness to which the clustering produced by the cluster solution groups the cluster candidate attributes, and a profile variable score that reflects a heterogeneity of the clustering produced by the cluster solution across both the cluster candidate attributes and the profile attributes;

generating, by the one or more visualization module servers, a user interface for presentation to a user showing the plurality of generated cluster solutions organized according to the calculated score for each cluster solution;

selecting, by the one or more computation management servers, a particular cluster solution based on the scores; and providing, by the one or more export module servers of the clustering solution system, the particular cluster solution to the client device of the external system that is external to the cloud-based clustering solution system, for use in assigning new data records that were not previously received by cloud-based clustering solution system to the plurality of clusters that were previously generated by the one or more computation node servers using the particular cluster solution, without requiring further intervention by the clustering solution system.

12. The system of claim 11, wherein generating the plurality of cluster solutions for the data set includes identifying the cluster solutions using a machine-learning algorithm based on previously calculated scores for cluster solutions.

13. The system of claim 11, the operations further comprising, while generating the plurality of cluster solutions, presenting a report to a user showing generated cluster solutions and allowing the user to change the sets of attributes associated with the data set.

14. The system of claim 11, wherein the calculated score for each cluster solution includes a weighted average of the target driver score, the cluster candidate score, and the profile variable score.

15. The system of claim 11, the operations further comprising, before generating the cluster solutions, transforming the data set into a format configured to facilitate generating the cluster solutions.

\* \* \* \* \*